United States Patent
Xiang et al.

(10) Patent No.: US 9,129,515 B2
(45) Date of Patent: Sep. 8, 2015

(54) ULTRASOUND MESH LOCALIZATION FOR INTERACTIVE SYSTEMS

(71) Applicant: QUALCOMM Incorporated, San Diego, CA (US)

(72) Inventors: Pei Xiang, San Diego, CA (US); Kwokleung Chan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 301 days.

(21) Appl. No.: 13/842,295

(22) Filed: Mar. 15, 2013

(65) Prior Publication Data
US 2014/0269212 A1    Sep. 18, 2014

(51) Int. Cl.
| | | |
|---|---|---|
| *G08C 23/02* | (2006.01) | |
| *G01S 3/80* | (2006.01) | |
| *G08B 23/00* | (2006.01) | |
| *H04B 7/00* | (2006.01) | |
| *G01S 3/803* | (2006.01) | |
| *G01S 5/24* | (2006.01) | |
| *G01S 5/30* | (2006.01) | |

(52) U.S. Cl.
CPC ............. *G08C 23/02* (2013.01); *G01S 3/803* (2013.01); *G01S 5/24* (2013.01); *G01S 5/30* (2013.01)

(58) Field of Classification Search
CPC ...................................... G08C 23/02
USPC .......... 340/539.11, 566, 573.1; 367/127, 124, 367/907; 455/41.2, 414.2, 414.3; 348/56
See application file for complete search history.

(56) References Cited

U.S. PATENT DOCUMENTS

| | | | |
|---|---|---|---|
| 3,623,242 A * | 11/1971 | Hoover | 434/319 |
| 6,688,891 B1 * | 2/2004 | Sanford | 434/365 |
| 6,690,618 B2 * | 2/2004 | Tomasi et al. | 367/127 |
| 6,912,178 B2 | 6/2005 | Chu et al. | |
| 7,123,213 B2 * | 10/2006 | Yamazaki et al. | 345/7 |
| 7,577,260 B1 | 8/2009 | Hooley et al. | |
| 7,587,053 B1 | 9/2009 | Pereira | |
| 7,876,914 B2 | 1/2011 | Grosvenor et al. | |
| 7,995,768 B2 | 8/2011 | Miki et al. | |

(Continued)

FOREIGN PATENT DOCUMENTS

WO    2005096008 A1    10/2005

OTHER PUBLICATIONS

International Search Report and Written Opinion—PCT/US2014/016065—ISA/EPO—Jun. 20, 2014, 11 pp.

(Continued)

*Primary Examiner* — Nam V Nguyen
(74) *Attorney, Agent, or Firm* — Shumaker & Sieffert, P.A.

(57) ABSTRACT

In general, techniques are described for locating a user using an ultrasound mesh. The techniques may be performed by an interactive system comprising one or more processors. The processors may be configured to determine an amplitude of a first ultrasound signal emitted by one or more transducers and received by a microphone. This first ultrasound signal may be of a first frequency. The processors may then determine an amplitude of a second ultrasound signal emitted by the one or more transducers and received by the microphone. The second ultrasound signal may be of a second frequency different from the first frequency. The processors may be further configured to determine a location of the microphone relative to the one or more transducers based at least on the determined amplitude of the first ultrasound signal and the determined amplitude of the second ultrasound signal.

29 Claims, 10 Drawing Sheets

(56) References Cited

U.S. PATENT DOCUMENTS

| | | | |
|---|---|---|---|
| 8,054,990 B2 | 11/2011 | Gratke et al. | |
| 8,183,997 B1* | 5/2012 | Wong et al. | 340/539.11 |
| 8,195,091 B2* | 6/2012 | Feldstein et al. | 455/41.2 |
| 8,204,248 B2 | 6/2012 | Haulick et al. | |
| 8,208,002 B2 | 6/2012 | Saleh et al. | |
| 8,223,992 B2 | 7/2012 | Suzuki et al. | |
| 8,269,822 B2* | 9/2012 | Zalewski | 348/56 |
| 8,514,225 B2* | 8/2013 | Genova | 345/422 |
| 8,823,782 B2* | 9/2014 | Karaoguz et al. | 348/51 |
| 8,963,956 B2* | 2/2015 | Latta et al. | 345/633 |
| 2005/0226437 A1 | 10/2005 | Pellegrini et al. | |
| 2006/0013066 A1 | 1/2006 | Nishimori et al. | |
| 2006/0088174 A1* | 4/2006 | DeLeeuw et al. | 381/96 |
| 2006/0285698 A1 | 12/2006 | Kong | |
| 2010/0253766 A1* | 10/2010 | Mann et al. | 348/51 |
| 2011/0026364 A1 | 2/2011 | Lee et al. | |
| 2011/0199460 A1* | 8/2011 | Gallagher | 348/46 |
| 2012/0044786 A1* | 2/2012 | Booij et al. | 367/127 |
| 2012/0127284 A1* | 5/2012 | Bar-Zeev et al. | 348/53 |
| 2012/0237037 A1 | 9/2012 | Ninan et al. | |
| 2013/0044180 A1* | 2/2013 | Shintani | 348/14.07 |
| 2014/0169136 A1* | 6/2014 | Booij et al. | 367/117 |

OTHER PUBLICATIONS

Second Written Opinion from International Application No. PCT/US2014/016065, dated Feb. 23, 2015, 15 pp.

Response to Second Written Opinion from International Application No. PCT/US2014/016065, dated Feb. 23, 2015, filed on Apr. 23, 2015, 3 pp.

\* cited by examiner

ULTRASOUND MESH LOCALIZATION FOR INTERACTIVE SYSTEMS

TECHNICAL FIELD

In general, the techniques described in this disclosure relate to audio localization and, more particularly, audio localization using an ultrasound mesh.

BACKGROUND

Generally, interactive systems commonly locate a user or a user-operated sensor using light. For example, some video game systems may utilize an infrared light sensor to locate a controller that emits infrared light signals. Alternative video game systems may utilize a camera to capture images (based on received light), processing these images to locate a user or a user operated controller (where the controller emits a light of a certain color (or wavelength) that facilitates locating the user operated controller). However, these light-based interactive systems are often expensive given the processing resources required to adequately locate a user or a user-operated sensor. Moreover, these light-based interactive systems often require a clear line of site between the camera or other light-sensing device and the user or user-operated sensor that may prohibit (often due to impractically large space requirements) more than two users from interacting with the light-based interactive system.

SUMMARY

In general, the techniques described in this disclosure provide for localization of a user or user-operated sensor using an ultrasound mesh. That is, one or more transducers, such as a speaker, may emit one or more ultrasounds, each at a different ultrasonic frequency, to form what may be referred to as an "ultrasound mesh." Within this mesh, a microphone or other audio capture device may capture each of the ultrasounds. In some instances, the microphone may then analyze the captured ultrasounds to identify the location of a user associated with the microphone, reporting this location back to a localization device or system. In other instances, the microphone may provide the captured ultrasound or characteristics of the captured ultrasound (e.g., the frequency and gain) to the localization device. By enabling audio localization using an ultrasound mesh, the techniques may reduce processing requirements and thereby potentially reduce costs, while also potentially enabling detection of a user or user-operated sensor without requiring a clear line of site between the localization device and the user or user-operated sensor.

In one aspect, a method comprises determining an amplitude of a first ultrasound signal emitted by one or more transducers and received by a microphone, where the first ultrasound signal is of a first frequency. The method further comprises determining an amplitude of a second ultrasound signal emitted by the one or more transducers and received by the microphone, where the second ultrasound signal is of a second frequency different from the first frequency. The method also comprises determining a location of the microphone relative to the one or more transducers based at least on the determined amplitude of the first ultrasound signal and the determined amplitude of the second ultrasound signal.

In another aspect, an interactive system comprises one or more processors configured to determine an amplitude of a first ultrasound signal emitted by one or more transducers and received by a microphone, wherein the first ultrasound signal is of a first frequency, determine an amplitude of a second ultrasound signal emitted by the one or more transducers and received by the microphone, wherein the second ultrasound signal is of a second frequency different from the first frequency, and determine a location of the microphone relative to the one or more transducers based at least on the determined amplitude of the first ultrasound signal and the determined amplitude of the second ultrasound signal.

In another aspect, an interactive system comprises means for determining an amplitude of a first ultrasound signal emitted by one or more transducers and received by a microphone, where the first ultrasound signal is of a first frequency. The interactive system also comprises means for determining an amplitude of a second ultrasound signal emitted by the one or more transducers and received by the microphone, where the second ultrasound signal is of a second frequency different from the first frequency. The interactive system further comprises means for determining a location of the microphone relative to the one or more transducers based at least on the determined amplitude of the first ultrasound signal and the determined amplitude of the second ultrasound signal.

In another aspect, a non-transitory computer-readable storage medium has stored thereon instructions that, when executed, cause one or more processors of an interactive system to determine an amplitude of a first ultrasound signal emitted by one or more transducers and received by a microphone, determine an amplitude of a second ultrasound signal emitted by the one or more transducers and received by the microphone, and determine a location of the microphone relative to the one or more transducers based at least on the determined amplitude of the first ultrasound signal and the determined amplitude of the second ultrasound signal. The first ultrasound signal is of a first frequency, while the second ultrasound signal is of a second frequency different from the first frequency.

The details of one or more aspects of the techniques described in this disclosure are set forth in the accompanying drawings and the description below. Other features, objects, and advantages of the techniques will be apparent from the description and drawings, and from the claims.

DETAILED DESCRIPTION

Figure 1:
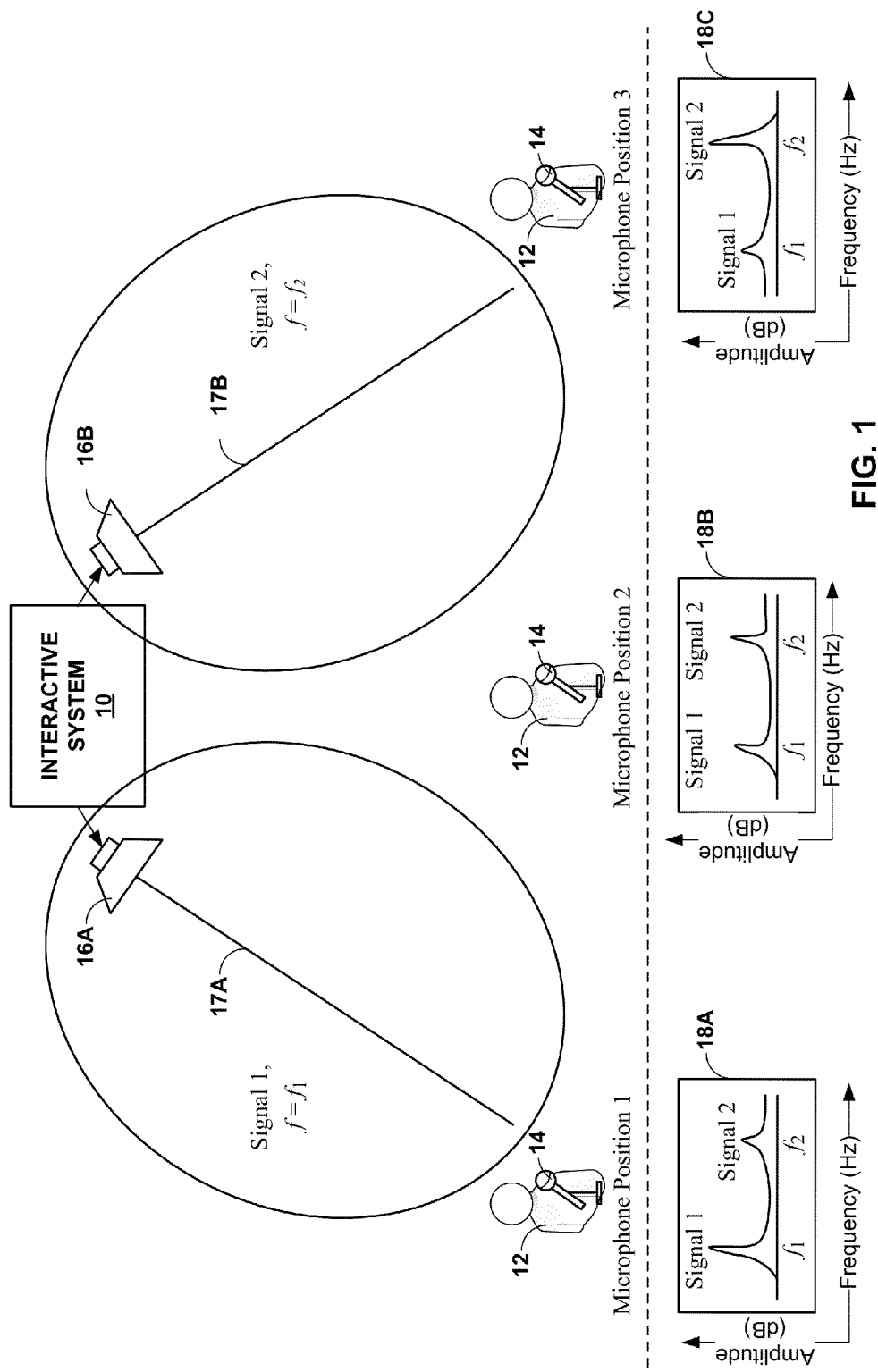
FIG. 1 is a block diagram illustrating an interactive system that may perform various aspects of the techniques described in this disclosure to locate a microphone associated with a user using an ultrasound mesh.

FIG. 1 is a block diagram illustrating an interactive system 10 that may perform various aspects of the techniques described in this disclosure to locate a microphone 14 associated with a user 12 using an ultrasound mesh. The interactive system 10 may generally represent a system comprising one or more devices that may interface with speakers 16A and 16B ("speakers 16") to emit ultrasounds of one or more ultrasonic frequencies to locate the microphone 14 in order to interact with the user 12. Examples of the interactive system 10 may comprise a two-dimensional (2D) television, a three-dimensional (3D) television, a so-called "smart television," a gaming system, a portable gaming system, a tablet computer, a laptop computer, a workstation, a desktop computer, a mobile phone, a so-called "smart phone," a digital video disc (DVD) player, a high-definition disc player, a personal media player, any other type of device with which the user 12 may interact or any combination of one or more of these types of devices.

The speakers 16 may each represent a transducer that converts electrical signals into sound. Although shown as separate from the interactive system 10, the interactive system 10 may include the speakers 16 as integrated components (meaning that the speakers 16 are included within the interactive system 10, often being integrated into the housing of the interactive system 10). In some instances, the speakers 16 may each comprise a speaker specifically configured to output ultrasounds. In other instances, the speakers 16 may each comprise a speaker that is capable of emitting sounds over a wide range of frequencies, including ultrasonic frequencies.

While shown as being arranged to emit ultrasounds 17A and 17B ("ultrasounds 17," which may also be referred to as "ultrasound beams 17"), respectively, in particular directions in the example of FIG. 1, the speakers 16 may be arranged in various configurations, such as a horizontal or vertical array of speakers, different than that shown in the example of FIG. 1. The speakers 16, when arranged, for example, in an array configuration, may all emit ultrasounds in a single same direction. In these configurations, the interactive system 10 may generate audio signals that are sent to the speakers 16 that facilitate beam forming so that the speakers 16 may form beams of ultrasounds that are effectively emitted in different directions to facilitate the localization of the microphone 14, as described below in greater detail.

The microphone 14 may represent any type of device capable of capturing sound. The microphone 14 may generally represent any type of acoustic-to-electric transducer or sensor that is capable of converting sound into an electrical signal. There are a number of different types of microphones, each of which varies in the way the different types of microphones capture sound. To provide a few examples, the microphone 14 may include a dynamic microphone (which refers to a microphone that capture sound using electromagnetic induction), a condenser microphone (which refer to a microphone that capture sound using capacitance change), and a piezoelectric microphone. While shown as the microphone 14, the microphone 14 may be incorporate within or internal to another device, such as a remote control, 3D glasses used for viewing a 3D television, a video game controller, an identification tag, a name tag, a shirt pin, a cellular phone, a so-called "smart phone," a laptop computer, a tablet computer, or any other portable or mobile device.

In general, interactive systems commonly locate a user or a user-operated sensor using light. For example, some video game systems may utilize an infrared light sensor to locate a controller that emits infrared light signals. Alternative video game systems may utilize a camera to capture images (based on received light), processing these images to locate a user or a user operated controller (where the controller emits a light of a certain color (or wavelength) that facilitates locating the user operated controller).

In the context of video game systems, often the video game system requires extensive processing capabilities to accurately identify the location of the controller and/or user, especially in the case where a camera is used to identify not just a user but the various appendages or other aspects of the user. In this sense, light-based user and/or user operated localization processes may not facilitate low cost localization of users and/or user operated sensors, which may prevent such light-based localization processes from being adopted in certain contexts.

Moreover, in some camera-based localization systems, the ability to identify three or more users without the aid of a light-based controller or other sensor may be difficult or impractical. For example, when three or more users are present, the users may need to be farther back from the camera so that each user does not overlap one another in an image or frame, making such camera-based localization system impractical for standard room settings. In this example, if the users stand closer together or partially in front of one another, the camera-based localization system may recognize only two users. The inability or impracticality of camera-based localization systems may prevent adoption in certain contexts.

Even overlooking the drawbacks of camera-based localization systems, most light-based localization systems suffer from spurious signals that may distort or result in misidentification of a user or user-operated controller. For example, an infrared remote control that is not associated with a video game system may generate signals that may be perceived by the video game system as originating from a controller associated with the video game system. The video game system may then locate the remote control and use the location of the remote control as the location of the controller, which may result in random or erratic game play. Likewise, in camera-based localization systems, bright lights or insufficient contrast between users and background may generate noise that resembles a controller or masks a user, leaving the video game system to interpret this noise in random ways that results, again, in random or erratic game play.

In accordance with the techniques described in this disclosure, a form of localization that relies on sound may be implemented in a number of different contexts to facilitate the localization of a microphone, which, depending on the context, may be associated with a user. Generally, the techniques may involve determining an amplitude of a first ultrasound signal emitted by one or more transducers (e.g., the speakers 16) and received by the microphone 14. This first ultrasound signal is typically at a specified frequency or within a specified range of frequencies. Additionally, the techniques may include determining an amplitude of a second ultrasound signal emitted by one or more of the speakers 16 and received by the microphone 14. This second ultrasound signal is of a second frequency or range of frequencies that is often different from the first frequency or range of frequencies. Based on these determined amplitudes, a location of the microphone 14 relative to the speakers 16 can be determined.

To illustrate, the interactive system 10 may, as shown in the example of FIG. 1, interface with the speaker 16A, providing an electrical signal to the speaker 16A that causes the speaker 16A to emit the ultrasound 17A at ultrasonic frequency, $f_1$. The interactive system 10 may also interface with the speaker 16B, providing an electrical signal to the speaker 16B that causes the speaker 16B to emit the ultrasound 17B at ultrasonic frequency, $f_2$. Assuming the user 12 and the microphone 14 associated with the user 12 are located at the location denoted "Microphone Position 1" in the example of FIG. 1, the microphone 14 may capture audio signals as shown in the corresponding the graph 18A. The x-axis of the graph 18A denotes frequency (as measured in Hertz (Hz)), while the y-axis of the graph 18A denotes amplitude in terms of decibels (dB).

As shown in the graph 18A, the microphone 14 captures an audio signal having a greater amplitude for signal one (1) having a frequency equal to $f_1$ than for signal two (2) having a frequency equal to $f_2$. In other words, ultrasounds are more tightly focused than other types of sounds having lower frequencies. For this reasons, ultrasounds may be characterized as ultrasound beams. Using two or more ultrasound beams of this type may enable the interactive system 10 to form what is referred to in this disclosure as an "ultrasound mesh." An ultrasound mesh may, in this disclosure, refer to two or more ultrasounds (or ultrasound beams) that cover a given area.

When the microphone 14 is moved within this ultrasound mesh, the audio captured by the microphone 14 may exhibit certain characteristics that facilitate localization of the microphone 14. That is, because ultrasounds have a high frequency and corresponding short wavelengths, the amplitude of the signal may change with respect to different sensing angles, with the highest amplitude occurring on-axis to the direction of the ultrasound beam or, in other words, directly in front of the speaker. The amplitude also varies depending on how close the microphone is to each of the speakers.

To continue the illustration of how the techniques utilize this ultrasound mesh to locate the microphone 14, it is assumed that the user 12 moves the microphone 14 to the position denoted "microphone position 2" in the example of FIG. 1 from microphone position 1. When in the microphone position 2, the microphone 14 is off-axis to the ultrasound 17A emitted by the speaker 16A and off-axis to the ultrasound 17B emitted by the speaker 16B. Moreover, when in the microphone position 2, the microphone 14 is approximately equidistant from the speakers 16. The resulting signal sensed by the microphone is shown in graph 18B, where the signal has approximately the same amplitude at the first frequency $f_1$ as at the second frequency $f_2$.

When the microphone 14 is positioned in the position denoted "microphone position 3" in the example of FIG. 1, the microphone 14 is off-axis to the ultrasound beam 17A emitted by the speaker 16A, but on-axis to the ultrasound beam 17B emitted by the speaker 16B, while also being more proximate to the speaker 16B than to the speaker 16A. The resulting signal sensed by the microphone 15 and shown in a graph 18C may therefore have a higher amplitude at the second frequency $f_2$ (relative to the amplitude at $f_1$) and a lower amplitude at the first frequency $f_1$ (relative to the amplitude at $f_2$). In this way, the interactive system 10 and/or the microphone 14 may determine, based on the amplitude of these frequencies or, more specifically, a ratio of the amplitude of these frequencies, a location of the microphone 14 (e.g., the frequency and amplitude may specify whether the microphone is in the first, second or third positions denoted as microphone positions 1, 2 and 3 in the example of FIG. 1).

In other words, when several of these speakers 16 are assembled in the interactive device 10, each emitting beams with different frequencies into different directions in space, the techniques may facilitate the creation of an ultrasound mesh. At each "node" of the mesh, the microphone 14 may be on axis to one of the ultrasound beams. When the microphone 14 is placed at these locations, the microphone 14 may pick up the strongest amplitude for the signal with corresponding frequency from the corresponding one or more of the speakers 16. At the same time, the microphone 14 may also pickup off-axis amplitude of signals with other frequencies from other ones of the speakers 16. When the microphone 14 is located in angles between different ones of the speakers 16, the relative amplitude of different frequency tones will vary accordingly, and the relative amplitude combinations may be processed to indicate the current angle of the microphone 14.

In operation, the interactive system 10 may determine an amplitude of a first ultrasound signal emitted by one or more transducers and received by a microphone, where the first ultrasound signal is of a first frequency. The interactive system 10 may also determine an amplitude of a second ultrasound signal emitted by the one or more transducers and received by the microphone, where the second ultrasound signal is of a second frequency different from the first frequency. As described in more detail below, the interactive system 10 may then determine a location of the microphone relative to the one or more transducers based at least on the determined amplitude of the first ultrasound signal and the determined amplitude of the second ultrasound signal.

Likewise, in some examples, the microphone 14 may determine an amplitude of a first ultrasound signal emitted by one or more transducers and received by a microphone, where the first ultrasound signal is of a first frequency. The microphone 14 may also determine an amplitude of a second ultrasound signal emitted by the one or more transducers and received by the microphone, wherein the second ultrasound signal is of a second frequency different from the first frequency. As described in more detail below, the microphone 14 may then determine a location of the microphone relative to the one or more transducers based at least on the determined amplitude of the first ultrasound signal and the determined amplitude of the second ultrasound signal.

When the location of the microphone 14 is determined by the interactive system 10, the interactive system 10 may utilize this determined location to facilitate interaction with the user 12, whether such interaction involves adapting or otherwise modifying 3D video content based on this determined location, adapting or otherwise modifying behavior of a game or other activity in which user 12 is participating, or presenting information or user interfaces specific to user 12 in response to the determined location to provide a few examples.

When the location of the microphone 14 is determined by the microphone 14, the microphone 14 may provide the determined location to the interactive system 10. The interactive system 10 may then utilize this determined location to facilitate interaction with the user 12 in the exemplary ways described above or any other ways by which such interactive systems may interact with the user 12.

In this manner, the techniques described in this disclosure may provide for localization of a user or user-operated sensor using an ultrasound mesh. That is, one or more transducers, such as the speakers 16, may emit the ultrasounds 17, each at a different ultrasonic frequency, to form what may be referred to as an "ultrasound mesh." Within this mesh, the microphone 14 or other audio capture device may capture each of the ultrasounds 17. In some instances, the microphone 14 may then analyze the captured ultrasounds to identify the location of the user 12 associated with the microphone 14, reporting this location back to a localization device or system. In other instances, the microphone 14 may provide the captured ultrasound or characteristics of the captured ultrasound (e.g., the frequency and gain) to a localization device, such as the interactive system 10. By enabling audio localization using an ultrasound mesh, the techniques may reduce processing requirements and thereby potentially reduce costs, while also potentially enabling detection of a user or user-operated sensor without requiring a clear line of site between the interactive system 10 and the user 12 or user-operated sensor device that includes the microphone 14.

Figure 2:
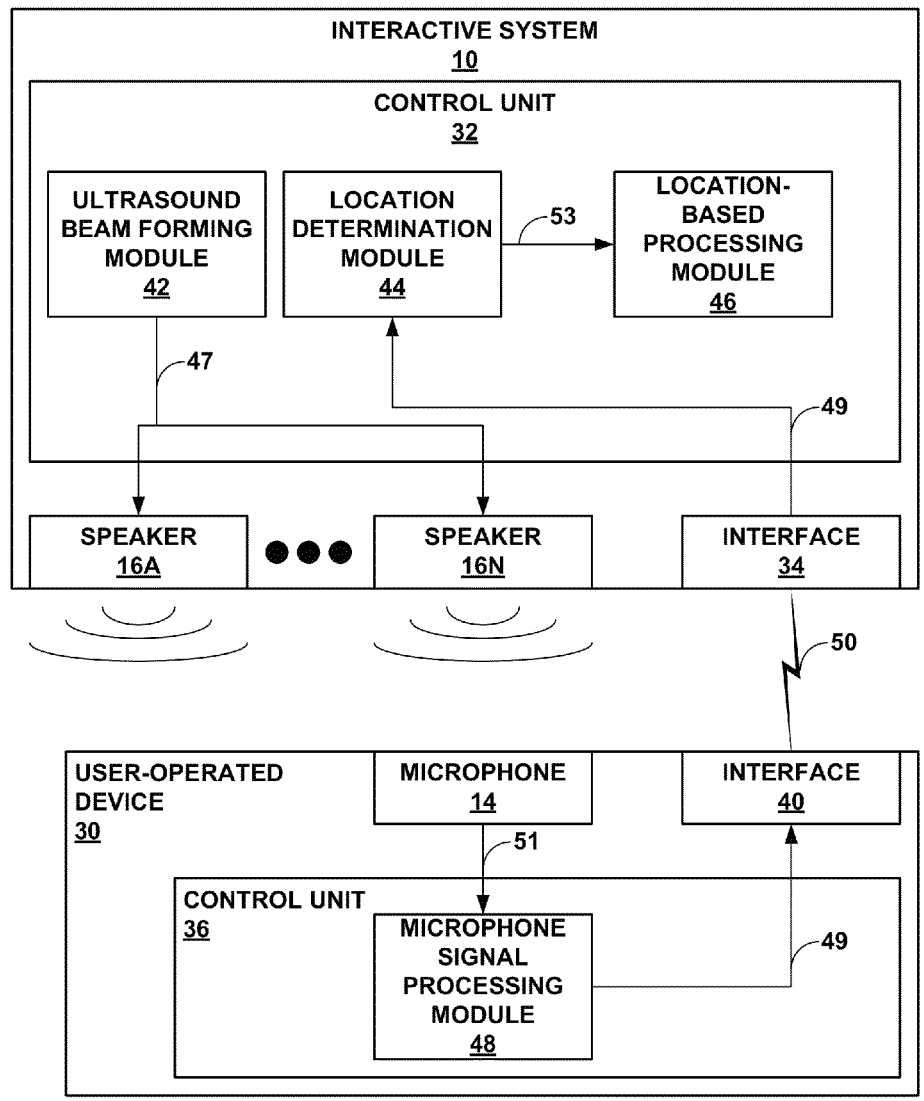
FIG. 2 is a block diagram illustrating an example of the interactive system of FIG. 1 in more detail when interfacing with a user-operated device that includes the microphone also shown in the example of FIG. 1.

FIG. 2 is a block diagram illustrating an example of the interactive system 10 of FIG. 1 in more detail when interfacing with a user-operated device 30 that includes the microphone 14 also shown in the example of FIG. 1. In the example of FIG. 2, the interactive system 10 includes a control unit 32, speakers 16A-16N ("speakers 16," where each of the speakers 16A-16N may be substantially similar to or the same as the speakers 16A and 16B described above with respect to the example of FIG. 1) and an interface 34.

The control unit 32 may represent one or more processors (not shown in FIG. 1), e.g., a central processing unit (CPU) and/or graphical processing unit (GPU), that execute software instructions, such as those used to define a software or computer program, stored to a non-transitory computer-readable medium (again, not shown in FIG. 1), such as a storage device (e.g., a disk drive, or an optical drive), or memory (such as Flash memory, random access memory or RAM) or any other type of volatile or non-volatile memory, that stores instructions to cause the one or more processors to perform the techniques described herein. Alternatively, the control unit 32 may represent dedicated hardware, such as one or more integrated circuits, one or more Application Specific Integrated Circuits (ASICs), one or more Application Specific Special Processors (ASSPs), one or more Field Programmable Gate Arrays (FPGAs), one or more digital signal processors (DSPs), or any combination of one or more of the foregoing examples of dedicated hardware, for performing the techniques described herein. The control unit 32 may, in some instances, represent a combination of dedicated hardware and one or more processors that execute software instructions.

The interface 34 may represent an interface capable of communicating via any form of proprietary, standardized or openly-defined communication protocol. The interface 34 may represent a physical interface capable of communicating either via a wire or other physical communication mediums or wirelessly. The interface 34 may, for example, communicate wirelessly via one or more Institute of Electrical and Electronics Engineers 802.11 set of standards, such as IEEE 802.11a, 802.11b, 802.11g, 802.11n, each of which defines protocols for a wireless wide area network (WAN). In addition or as an alternative to this form of wireless WAN, the interface 34 may communicate wirelessly via a wireless personal area network (WPAN), such as those based off of or defined in the IEEE 802.15.

The user-operated device 30 includes a control unit 36, a microphone 14 (which may be substantially the same as microphone 14 shown as a stand-alone microphone in the example of FIG. 1) and an interface 40. The control unit 36 may be substantially similar to the control unit 32 described above in terms of what the control unit 36 may represent in the example of FIG. 2 (referring generally to the above described one or more processors, dedicated hardware or some combination thereof). The interface 40 may also be substantially similar to interface 34 in terms of what the interface 40 may represent in the example of FIG. 2.

As further shown in the example of FIG. 2, the control unit 32 of interactive system 10 may include an ultrasound beam forming module 42, a location determination module 44 and a location-based processing module 46. The ultrasound beam forming module 42 may represent a module that generates audio signals 47, which when provided or fed to the speakers 16 cause the speakers 16 to emit ultrasound beams, such as ultrasound beams 17 shown in the example of FIG. 1. The ultrasound beam forming module 42 may generate audio signals having an ultrasonic frequency and then perform signal processing to control the phase and/or the relative amplitude of the signal at each of the speakers 16 in order to create a pattern of constructive and destructive interference in the audio wavefront emitted by the speakers 16. This beam forming may, in this sense, represent a form of spatial filtering, where the audio signals 47 for each of the speakers 16 are filtered such that when played by the speakers 16 the wavefront of the audio emitted by the speakers 16 forms what may be characterized as a "beam."

In this respect, the beam forming module 42 may process the first ultrasound signal 47 prior to providing the first ultrasound signal 47 to the speakers 26 (which may, as noted in this disclosure, be arranged in an array) so as to generate a first directional ultrasound signal 47 that, when emitted by the speakers 16 in the array, appears to be directed in a first direction. The ultrasound beam forming module 42 may also processing the second ultrasound signal 47 prior to providing the second ultrasound signal 47 to the speakers 16 in the array so as to generate a second directional ultrasound signal 47 that, when emitted by the speakers 16 in the array, appears to be directed in a second direction. The ultrasound beam forming module 42 may then concurrently provide the first and second directional ultrasound signals 47 to the speakers 16 in the array such that the speakers 16 in the array concurrently emit the first and second direction ultrasound signals (such as ultrasound beams 17 shown in the example of FIG. 1) as the first and second ultrasound signals.

The location determination module 44 may represent a module that determines a location of the user-operated device 30 and, more specifically, the microphone 14. The location determination module 44 may receive location information 49 via the interface 34 from the user-operated device 30. In some instances, this location information 49 may include the location of microphone 14 as computed by the user-operated device 30 based on audio signals 51 captured by the microphone 14. Reference to the location of microphone 14 may refer to the location of the microphone 14 as measured relative to the speakers 16, as is described in more detail below.

In any event, the location determination module 44 may, in this instance, represent a module that determines the location of the microphone 14 by receiving the location information 49. In this sense, the location information 49 may include the location 53, which was computed by the microphone signal processing module 53 and specified as at least a portion of the location information 49. The location information 49 may further include a code, identifier or other data to indicate that the location information 49 corresponds to the user-operated device 30 or the user operating the user-operated device 30. The location determination module 44 may, upon receiving the location information 49 specifying the location of the user-operated device 30, perform further processing to refine the location information based, for example, on previously received location information 49. That is, the location determination module 44 may compute an average location over the last couple of iterations of receiving the location information 49 (which may be, as an example, an average location over the last couple of tens of minutes, minutes, seconds, and/or milliseconds depending on the context in which interactive system 10 is employed).

In some instances, the location information 49 may specify either the captured audio signals 51 (captured at the microphone 14 of the user-operated device 30), a processed form of captured audio signals 51 (e.g., a compressed form of captured audio signals 51), or some other processed form of captured audio signals 51 (e.g., ratios of amplitudes of the captured audio signals, which is, as described below in more detail indicative of the location of the microphone 15). In these instances, the location information 49 represents information that specifies the location of the microphone 14 in an unprocessed or pre-processed form, but that does not explicitly specify the location of the microphone 14. The location determination module 44, in these instances, may represent a module that computes the location of the microphone 14 based on the location information 49 using various aspects of the techniques described in more detail below.

Briefly, the location determination module 44 may perform some form of frequency analysis, such as a fast Fourier transform (FFT), or other signal processing to determine an amplitude at various frequencies. The location determination module 44 may compare the amplitude at various frequencies to determine a ratio between an amplitude at one frequency and an amplitude at a different frequency (where each frequency may be associated with a different speaker). Based on this ratio, the location determination module 44 may determine the location 53 (as evidenced by the graphs 18 shown in the example of FIG. 1).

The location-based processing module 46 represents a module that receives the location 53 determined by location determination module 44 and processes the location to perform some action (at least some of the time) in response to receiving the location 53. The location-based processing module 46 may, for example, process the location 53 to determine whether to adjust playback of three-dimensional video data (such as when a viewer operating or wearing the user-operated device 30 moves beyond a relocation threshold). The location-based processing module 46 may, as another example, determine when a user operating the user-operated device 30 is proximate (within some proximity threshold) to the interactive system 10 or some component of the interactive system 10 in which the speakers 16 are located. Further examples of the context in which the interactive system 10 may be employed are described below with respect to the examples of FIGS. 6-11.

While described as being included within the interactive system 10, the location-based processing module 46 may be included within any device to which the interactive system 10 is included as a component of this device or may be included within any device to which the interactive system 10 may interface as a component of this device. In other words, the interactive system 10 may not include the location-based processing module 46 but may represent a system by which a location of the microphone 14 is determined. The interactive system 10 may then provide this location to any form of location-based processing module of any device to which the interactive system 10 interfaces, whether the interactive system 10 is internal to or incorporated within or external from this device. The techniques described in this disclosure should therefore not be limited in this respect to the examples provided in this disclosure.

The control unit 36 of the user-operated device 30 may include a microphone signal processing module 48. The microphone signal processing module 48 may represent a module that processes captured audio signals 51 to generate the location information 49. As noted above, the microphone signal processing module 48 may process the captured audio signals 51 to compute the location of the microphone 14. IN some instances, rather than compute this location, the microphone signal processing module 48 may process the captured audio signals 51 to generate location information 49 that includes the captured audio signals 51, a compressed form of the captured audio signals 51 and/or some derivative thereof.

In operation, the control unit 36 of the user-operated device 30 may register with the interactive system 10 (often automatically upon powering on or activating the user-operated device 30 and assuming the interactive system 10 is already powered on or activated). The control unit 36 may register with the interactive system 10 by sending a registration code or other registration information, whereupon the interactive system 10 may begin generating the audio signals 47 (when not already generating audio signals 47). The speakers 16 may then output audio based on the audio signals 47.

The microphone 14 of the user-operated device 30 may sense, detect or otherwise capture the sound audio signals 47, generating the captured audio signals 51 (which may differ from the audio signals 47 due to noise or other interference). The control unit 36 may then invoke the microphone signal processing module 48 to process the captured audio signals 51. The microphone signal processing module 48 may perform any form of signal processing often to reduce residual noise or interference. The microphone signal processing module 48 may perform transforms with respect to the captured audio signals 51 so as to transform, such as a discrete cosine transform (DCT), the captured audio signals from a spatial domain to a frequency domain. The microphone signal processing module 48 may, in this way, represent a module that may perform any form of signal processing to improve the quality of or otherwise alter the captured audio signals 51. The microphone processing module 51 may then generate the location information 49 in one or more of the various ways described above, providing this location information 49 to the interface 40.

As noted above, the user-operated device 30 may register with the interactive system 10. Part of this registration process may involve establishing one or more communication channels 50 via a wired or wireless protocol, such as any of those described above. The user-operated device 30 may establish these communication channels 50 as persistent channels that remain active as long as the user-operated device 30 and the interactive system 10 are operational. Alternatively, the user-operated device 30 may establish these communication channels 50 for set durations or as required, such as in response to receiving the location information 49. In any event, the interface 40 may communicate the location information 49 via the communication channel 50 to interface 34 of the interactive system 10.

The interface 34, upon receiving this location information 49, may transmit this location information 49 to the location determination module 44. The location determination module 44 may then determine the location 53 in any of the various ways described above, transmitting this location 53 to the location-based processing module 46. The location-based processing module 46 may then process this location 53 to perform any of the actions described in this disclosure.

Figure 3:
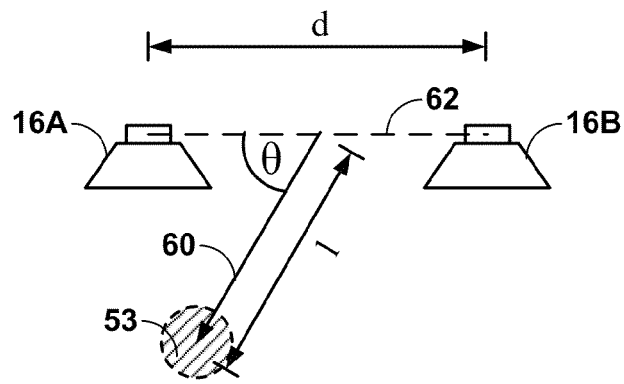
FIG. 3 is a diagram illustrating the computation of the location by one of the user-operated device or the interactive system shown in the examples of FIGS. 1 and 2 with respect to two speakers.

FIG. 3 is a diagram illustrating the computation of the location 53 by one of the user-operated device 30 or the interactive system 10 shown in the examples of FIGS. 1 and 2 with respect to two speakers 16A and 16B. That is, as described above, either the system 10 or the device 30 may compute, based on the captured audio signals 51 or some derivative thereof, the location 53. While described below as being computed by the system 10, the computation aspects of the techniques may be performed device 30 or possibly some intervening device, such as a dongle device that interfaces with the interactive system 10 or the user-operated device 30.

In the example of FIG. 3, the location determination module 44 may compute location with respect to two speakers, which may represent the speakers 16A and 16B shown in the example of FIG. 1. The location determination module 44 may be configured to know the distance, d, separating the speaker 16A from the speaker 16B. Typically, the distance d is specified as the distance from the center point of the speaker 16A and the center point of the speaker 16B. Often, this distance d is static and does not fluctuate, especially when speaker arrays are used that include a line of two or more speakers set as specific distances d. In some instances, the user may interface with the interactive system 10 to specify the distance d, where the user may have to physically measure distance d. Typically, the user has to specify the distance d only when the speaker positions are unknown. In some instances, the interactive system 10 may derive the distance d using speaker location techniques (which generally involves interfacing with the speakers 16 to cause them to emit tones by which the interactive system 10 may monitor using a microphone to derive the location of each of the speakers 16).

In any event, the location determination module 44 may compute the middle point between the two of the speakers 16 as the distance d divided by two (d/2). In some instances, rather than configure the location determination module 44 with the distance d, the location determination module 44 may be configured with the middle point, d/2. From this middle point d/2, the location determination module 44 may determine the starting point of a vector 60 that ends at the location 53.

To compute the end of the vector 60, the location determination module 44 may analyze the captured audio signals 51 received as at least a portion of the location information 49 to determine a ratio of the amplitude of the first ultrasound signal emitted by the speaker 16A (and denoted as the ultrasound beam 17A in the example of FIG. 1) to the amplitude of the second ultrasound signal emitted by the speaker 16B (and denoted as the ultrasound beam 17B in the example of FIG. 1). The location determination module 44 may then compute or otherwise determine the location of the microphone relative to the speakers 16 based at least on the determined ratio.

That is, using the ratio of the amplitude of the frequencies may enable the location determine module 44 to determine an angle at which the microphone 14 is relative to a center point equidistant between the speakers 16 (which is another way of referring to the middle point, d/2). The location determination module 44 may compute the distance of the microphone 14 relative to the speakers 16 based on the amplitudes alone. This distance may be referred to as the length, l, of the vector 60 in the example of FIG. 3. In some instances, the location determination module 44 may compute the distance of the microphone 14 relative to the speakers 16 based on the amplitudes alone. In effect, using the pair of speakers 16 enables the location determination module 44 to form the vector 60 starting from the center point and ending at the location of microphone, with the angle $\theta$ specified relative to the line 62 on which both of the speakers 16 reside.

In this sense, the above describes how the location determination module 44 may compute this vector 60 from the center point between the speakers 16, where the location determination module 40 uses the ratio of the amplitude of the frequencies compute the angle $\theta$ and uses the amplitudes to determine the length, l.

Figure 4:
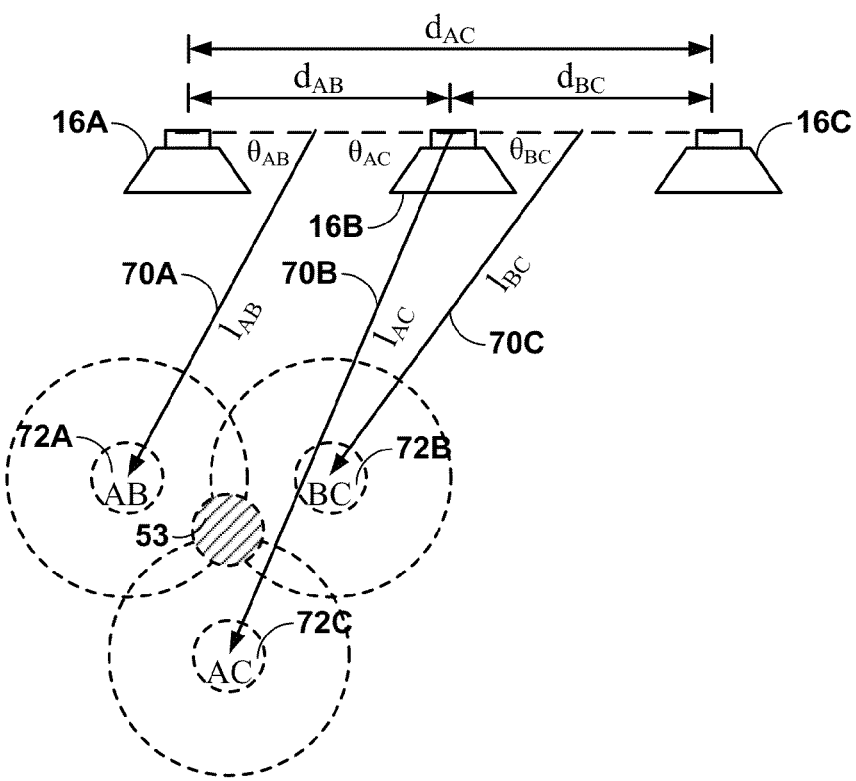
FIG. 4 is a diagram illustrating the computation of the location by one of the user-operated device or the interactive system shown in the examples of FIGS. 1 and 2 with respect to three speakers.

FIG. 4 is a diagram illustrating the computation of the location 53 by one of the user-operated device 30 or the interactive system 10 shown in the examples of FIGS. 1 and 2 with respect to three speakers 16A-16C. That is, as described above, either the system 10 or the device 30 may compute, based on the captured audio signals 51 or some derivative thereof, the location 53. While described below as being computed by the system 10, the computation aspects of the techniques may be performed device 30 or possibly some intervening device, such as a dongle device that interfaces with the interactive system 10 or the user-operated device 30.

As shown in the example of FIG. 4, the location determination module 44 may compute the location 53 based on three vectors 70A-70C ("vectors 70"). The location determination module 44 may determine each of the vectors 70 in the manner described above with respect to the example of FIG. 3. That is, the location determination module 44 may be configured with the distance d between each of the various pairs of the speakers 16, i.e., the speakers 16A and 16B, the speakers 16B and 16C and the speakers 16A and 16C. To denote the different distances d, each of the distances d contains a subscript with the two letters identifying each pair, where the speaker 16A may be denoted as the "speaker A", the speaker 16B may be denoted as the "speaker B" and the speaker 16C may be denoted as the "speaker C." Accordingly, the distance d between the speaker 16A and the speaker 16B may be denoted distance $d_{AB}$, the distance d between the speaker 16B and the speaker 16C may be denoted distance $d_{BC}$ and the distance d between the speaker 16A and the speaker 16C may be denoted distance $d_{AC}$. This same notation also carries over to the angles $\theta$ and the lengths, l, of each of the vectors 70 and the locations 72A-72C ("locations 72") to which each of these vectors 70 identify.

In the example of FIG. 4, the inner circle denotes an approximate location of the microphone when the location is approximated with high confidence. The outer circle denotes an approximate location of the microphone when the location is approximated with low confidence. In FIG. 4, the three vectors 70 disagree with one another and do not identify the corresponding locations 72 that agrees with one another.

In some instances, the techniques may enable a device to identify one of the vectors 70 that identifies the corresponding one of locations 72 of the microphone 14 outside of a threshold location derived based on the remaining two of the vectors 70. For example, in FIG. 4, a maximum vertical component of vector 70A (which may be denoted as the "vector AB") and the vector 72C (which may also be denoted as the "vector BC") each locates the microphone 14 as being much closer to the speakers 16 than the vertical component of vector 70C (which may also be denoted as the "vector AC"). As a result, the location determination module 44 may implement this aspect of the techniques to define a maximum vertical threshold of %110 percent as that of the vertical component of vector BC or AB. The device may then discard the identified one of the vectors 70 that identifies a location of the microphone 14 outside of the threshold location, which may result in discarding the vector 70C (or, per the other notation the vector AC). The location determination unit 44 may then determine the location of the microphone 14 relative to the speakers 16 based on the remaining two of the determined vectors 70, e.g., the remaining vectors AB and BC.

Alternatively, or in conjunction with the above aspect of the techniques related to discarding various ones of the vectors 70, the techniques may provide for a voting system, whereby the location determination module 44 clusters the three points or locations 72 identified by the three vectors 70 to find a "center of gravity" to be the location 53 of the microphone 14, as shown in the example of FIG. 3. Moreover, in some instances, the center of gravity aspect may be employed in a weighted fashion based on the amplitudes of the captured audio signals 51.

The aspects of the techniques described above to triangulate the location 53 of the microphone 14 can also be extended to accommodate any number of the speakers 16, where more of the speakers 16 may be used to identify or otherwise determine the location 53 of the microphone 14 in a three dimensional space. Moreover, as shown in the example of FIG. 4, the speakers 16 may be arranged in an array configuration, where software manipulation of the audio signals 47 to be emitted by the speakers 16 may be performed to form ultrasound beams in the manner described above using one or more of the speakers 15 in the array.

With respect to the speaker array, the techniques may be implemented such that a first frequency is supplied to each of the speakers 16 in the form of the audio signals 47 in the speaker array, whereby all of the speakers 16 work coherently to direct the signal to one direction (e.g., the direction of speaker 16A shown in the example of FIG. 1). If a speaker array is used, the speaker array two or more speakers may collectively work together to emit the ultrasound beam, where the location may be measured from the distance between these two or more speakers (or if all of these speakers of the array are used, as the center of the speaker array). Moreover, the ultrasound beam forming module 42 may provide a second frequency different from the first frequency via the audio signals 47 concurrently with the above first frequency to each of the speakers 16 in the speaker array such that this second frequency is coherently directed to a second direction (such as the direction of speaker 16B shown in the example of FIG. 1). In this manner, the techniques described in this disclosure may enable a speaker array to form ultrasonic beams that, when emitted by the speakers 16, may be directed in any direction in front of the speakers 16.

Speaker arrays may be employed in this manner to facilitate manufacturing of the speakers 16 to accommodate the techniques described in this disclosure. Rather than having the speakers 16 that rotate and/or turn by mechanical means, the speaker array may be designed such that all of the speakers 16 of the array face a single direction. By using the above described beam forming techniques to alter the signals 47, the emitted ultrasound beam from the speakers 16 of the array may be directed in different directions. Thus, signal processing may enable, as described above, the sound or wavefront of the sound to be directed in different directions without having to manually adjust the speakers 16 in the speaker array.

In this manner, the techniques may enable the location determination module 44 to determining an amplitude of a third ultrasound signal (in addition to the first and second ultrasound signals emitted by the speakers 16) emitted by the speakers 16 and received by the microphone 14. The location determination module 44 may then determine the vector 70A from the speakers 16 to the microphone 14 based on the amplitude of the first ultrasound signal and the amplitude of the second ultrasound signal. The location determination module 44 may determine the vector 70B based on the amplitude of the first ultrasound signal and the amplitude of the third ultrasound signal emitted by the speakers 16. Based on the amplitude of the second ultrasound signal and the amplitude of the third ultrasound signal, the location determination module 44 may also determine the vector 70C. The location determination module 44 may determine the location of the microphone 14 relative to the speakers 16 based on two or more of the determined vectors 70.

In some instances, the location determination module 44 may, as noted above, identify one of the determined vectors 70 that identifies the corresponding location 72 of the microphone 14 outside of a threshold location derived based on the remaining two of the determined vectors 70. The location determination module 44 may then discard the identified one of the determined vectors 70 that identifies the corresponding one of locations 72 of the microphone 14 outside of the threshold location. The location determination module 44 may then determine the location 53 of the microphone 14 relative to the speakers 16 based on the remaining two of the determined vectors 70.

While described above with respect to the two-dimensional location 53, the techniques of this disclosure may be extended to three-dimensional space when more speakers 16 are available. Given that measurement error may exist in three-dimensional space, the location determination module 44 may determine an average of the center location to which each of the various vectors 70 in this three-dimensional space point.

Figure 5:
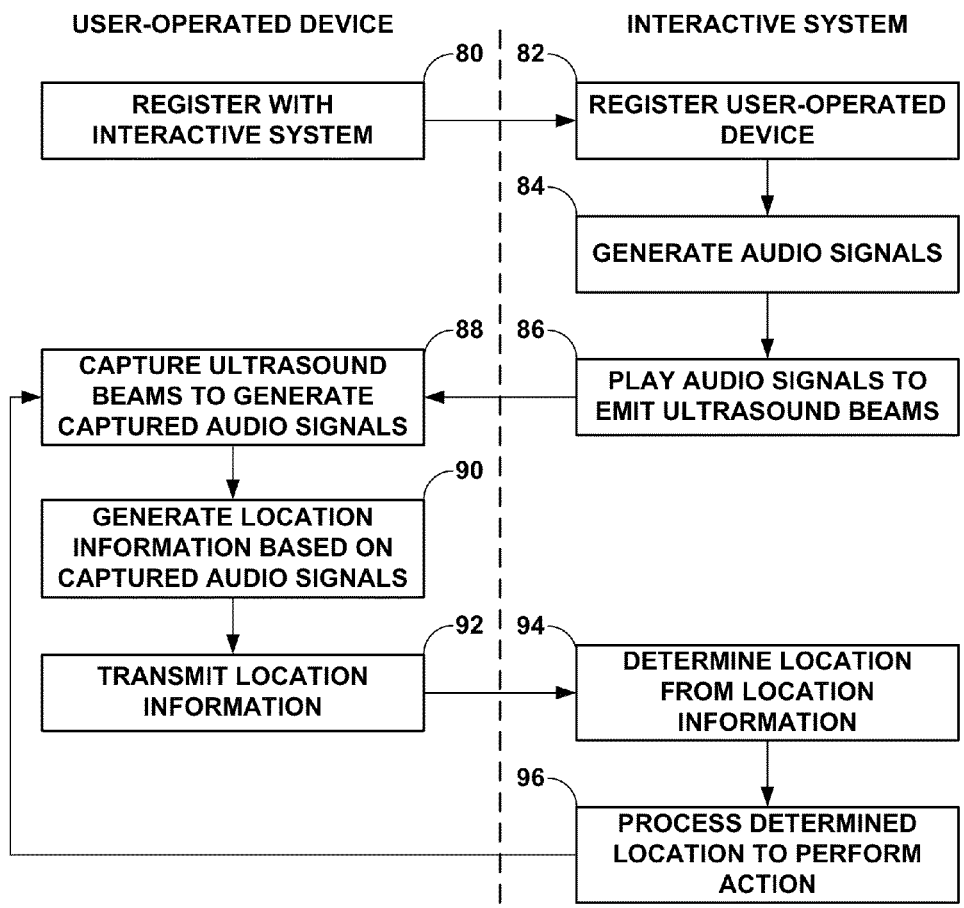
FIG. 5 is a flow chart illustrating exemplary operation of one of the interactive system or the user-operated device of FIGS. 1 and 2 in performing the techniques described in this disclosure.

FIG. 5 is a flow chart illustrating exemplary operation of one of the interactive system 10 or the user-operated device 30 (both of which are shown in the example of FIG. 2) in performing the techniques described in this disclosure. As described above, either the system 10 or the device 30 may compute, based on the captured audio signals 51 or some derivative thereof, the location 53. While described below as being computed by the system 10, the computation aspects of the techniques may be performed device 30 or possibly some intervening device, such as a dongle device that interfaces with the interactive system 10 or the user-operated device 30.

In operation, the control unit 36 of the user-operated device 30 may register with the interactive system 10 (often automatically upon powering on or activating the user-operated device 30 and assuming the interactive system 10 is already powered on or activated) (80). The control unit 36 may register with the interactive system 10 by sending a registration code or other registration information, whereupon the interactive system 10 may begin generating the audio signals 47 (when not already generating audio signals 47). The interactive system 10 may register the user-operated device 30 to operate in a location-based interactive manner with the interactive system 10 (82). The control unit 32 may then invoke the ultrasound beam forming module 42 to generate the audio signals 47 in the manner described above (84). The speakers 16 may then output or play audio signals 47 to emit ultrasound beams, such as the ultrasound beams 17 shown in the example of FIG. 1 (86).

The microphone 14 of the user-operated device 30 may sense, detect or otherwise capture the sound audio signals 47 (88), generating the captured audio signals 51 (which may differ from the audio signals 47 due to noise or other interference) (88). The control unit 36 may then invoke the microphone signal processing module 48 to process the captured audio signals 51 in the manner described above and thereby generate the location information 49. That is, the microphone signal processing module 48 may generate the location information 49 based on the captured audio signals 51 (90).

As noted above, the user-operated device 30 may register with the interactive system 10. Part of this registration process may involve establishing one or more communication channels 50 via a wired or wireless protocol, such as any of those described above. The user-operated device 30 may establish these communication channels 50 as persistent channels that remain active as long as the user-operated device 30 and the interactive system 10 are operational. Alternatively, the user-operated device 30 may establish these communication channels 50 for set durations or as required, such as in response to receiving the location information 49. In any event, the interface 40 may transmit the location information 49 via the communication channel 50 to interface 34 of the interactive system 10 (92).

The interface 34, upon receiving this location information 49, may transmit this location information 49 to the location determination module 44. The location determination module 44 may then determine the location 53 in any of the various ways described above (94), transmitting this location 53 to the location-based processing module 46. The location-based processing module 46 may then process this location 53 to perform any of the actions described in this disclosure (96).

Figure 6:
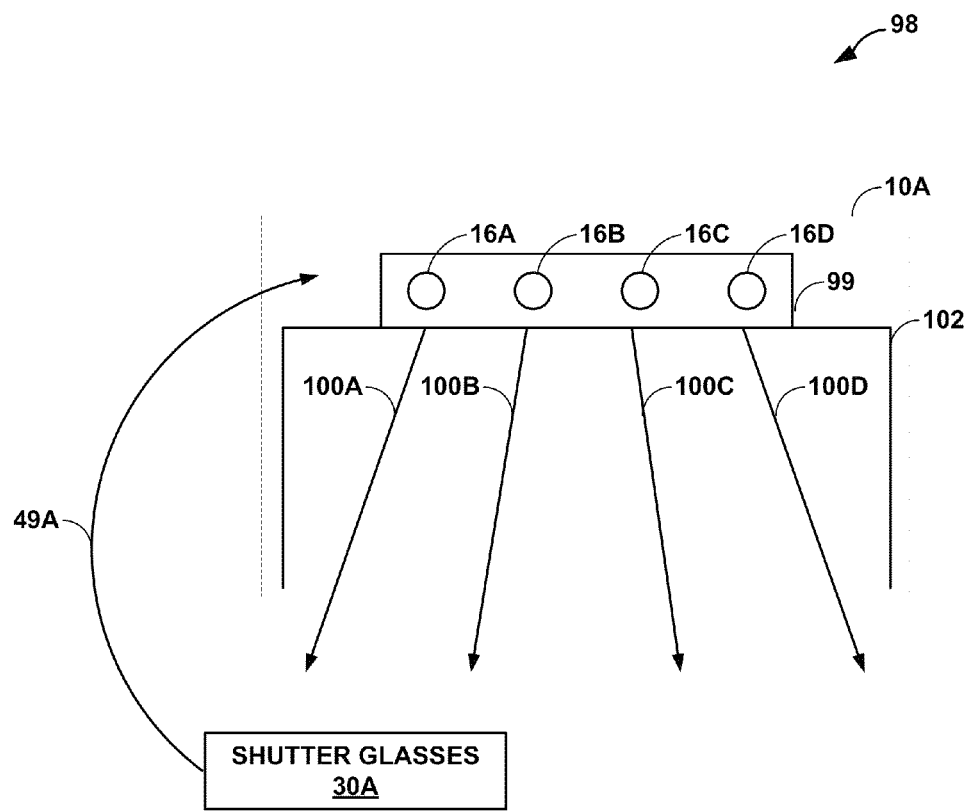
FIG. 6 is a diagram illustrating an exemplary three-dimensional (3D) video data viewing system in which various aspects of the techniques described in this disclosure may be performed.

FIG. 6 is a diagram illustrating an exemplary three-dimensional (3D) video data viewing system 98 in which various aspects of the techniques described in this disclosure may be performed. In the example of FIG. 6, a television 102 may include a speaker array 99 having four speakers 16A-16D ("speakers 16") that output ultrasound beams 100A-100D ("ultrasound beam 100"). The television 102 may in conjunction with the speakers array 99 represent one example of the interactive system 10 shown in the example of FIG. 2, and may be denoted for purposes of reference as the "interactive system 10A."

Additionally, shutter glasses 30A may represent one example of the user-operated device 30 shown in the example of FIG. 2 and may be denoted for purposes of reference as the "shutter glasses 30A." Shutter glasses 30A may include the microphone 14 or an array of two or more microphones 14. The techniques may then be implemented in the manner described above to determine a location of the shutter glasses 30A relative to the speaker array 99. Typically, in 3D video playback, the location, which is shown as location information 49A given the similarity or substantial similarity to location information 49 shown in the example of FIG. 2 is utilized to determine a view that should be presented to the user (not shown in the example of FIG. 6 for ease of illustration purposes) wearing the shutter glasses 30A. This location information 51A may be obtained in the manner described above using the techniques described in this disclosure such that the interactive system 10A may request a view of a scene that roughly corresponds to the location 53 of the shutter glasses 30A relative to the speaker array 99.

In this manner, the techniques may enable the television 102 to select one of a number of views included within video data that approximates viewing a scene presented by the video data from a relative location similar to the determined location 53 of the microphone 14 relative to the speakers 16 and present the selected one of the plurality of views. In this context, the techniques may provide an elegant, potentially low-power way by which to locate a potentially large number of viewers viewing a 3D display (such as the television 102) so as to facilitate presenting what may be considered a "correct" view to each of the viewers wearing corresponding ones of the shutter glasses 30A. While described above with respect to the active shutter glasses 30A, the techniques may be performed with respect to passive types of the 3D viewing glasses or any other type of 3D viewing glasses.

Figure 7:
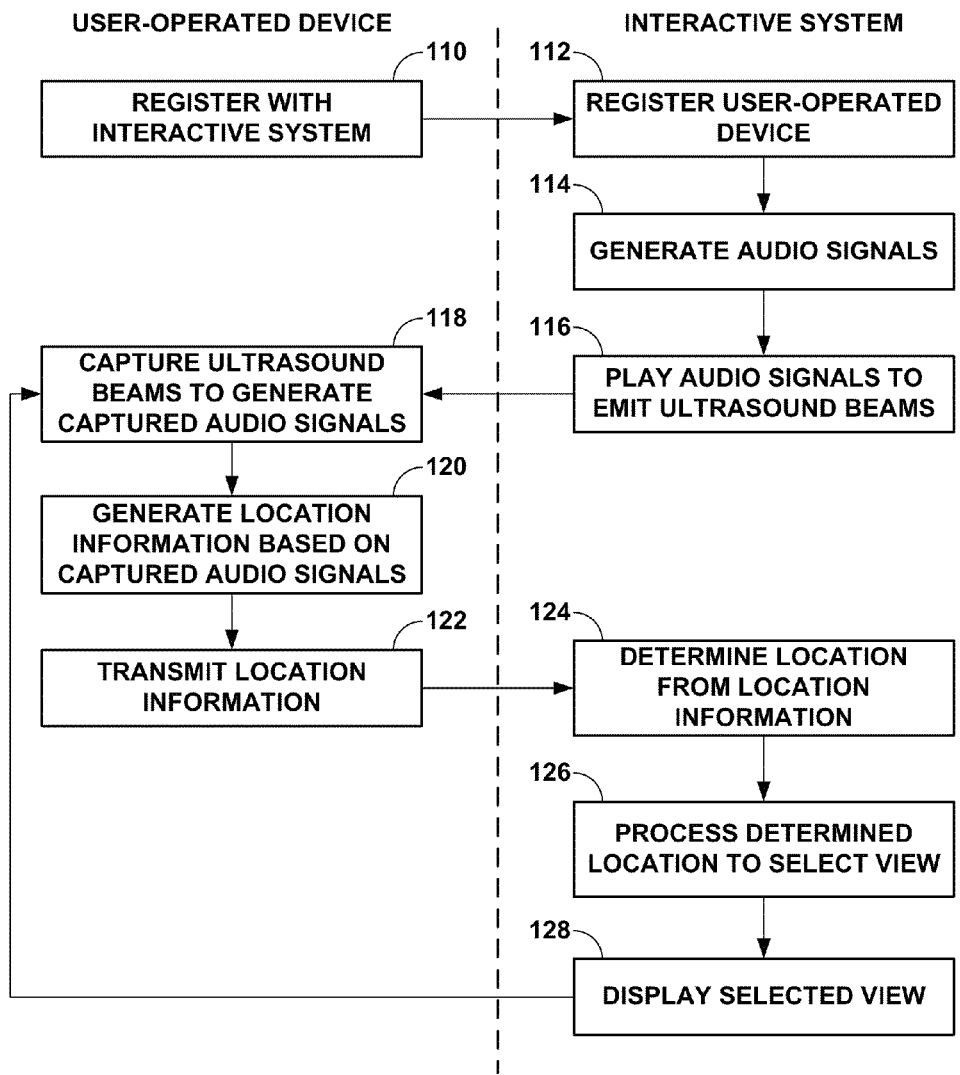
FIG. 7 is a flowchart illustrating exemplary operation of the interactive system and the shutter glasses of FIG. 6 in perform various aspects of the techniques described in this disclosure.

FIG. 7 is a flowchart illustrating exemplary operation of the interactive system 10A and the shutter glasses 30A of FIG. 6 in perform various aspects of the techniques described in this disclosure. As described above, either the system 10A or the device 30A may compute, based on the captured audio signals 51 or some derivative thereof, the location 53. While described below as being computed by the system 10A, the computation aspects of the techniques may be performed device 30A or possibly some intervening device, such as a dongle device that interfaces with the interactive system 10A or the user-operated device 30A.

In operation, the control unit 36 of the user-operated device 30A may register with the interactive system 10A (often automatically upon powering on or activating the user-operated device 30A and assuming the interactive system 10A is already powered on or activated) (110). The control unit 36 may register with the interactive system 10A by sending a registration code or other registration information, whereupon the interactive system 10A may begin generating the audio signals 47 (when not already generating audio signals 47). The interactive system 10A may register the user-operated device 30A to operate in a location-based interactive manner with the interactive system 10A (112). The control unit 32 may then invoke the ultrasound beam forming module 42 to generate the audio signals 47 in the manner described above (114). The speakers 16 may then output or play audio signals 47 to emit ultrasound beams, such as the ultrasound beams 17 shown in the example of FIG. 1 (116).

The microphone 14 of the user-operated device 30A may sense, detect or otherwise capture the sound audio signals 47 (118), generating the captured audio signals 51 (which may differ from the audio signals 47 due to noise or other interference). The control unit 36 may then invoke the microphone signal processing module 48 to process the captured audio signals 51 in the manner described above and thereby generate the location information 49A. That is, the microphone signal processing module 48 may generate the location information 49A based on the captured audio signals 51 (120). The interface 40 may transmit the location information 49A via the communication channel 50 to interface 34 of the interactive system 10A (122).

The interface 34, upon receiving this location information 49A, may transmit this location information 49A to the location determination module 44. The location determination module 44 may then determine the location 53 in any of the various ways described above (124), transmitting this location 53 to the location-based processing module 46. The location-based processing module 46 may then process this location 53 to perform any of the actions described in this disclosure. In the three dimensional viewing context, the location-based processing module 46 may process the determined location to select a view and present this view via the television 102 in the manner described above (126, 128).

Figure 8:
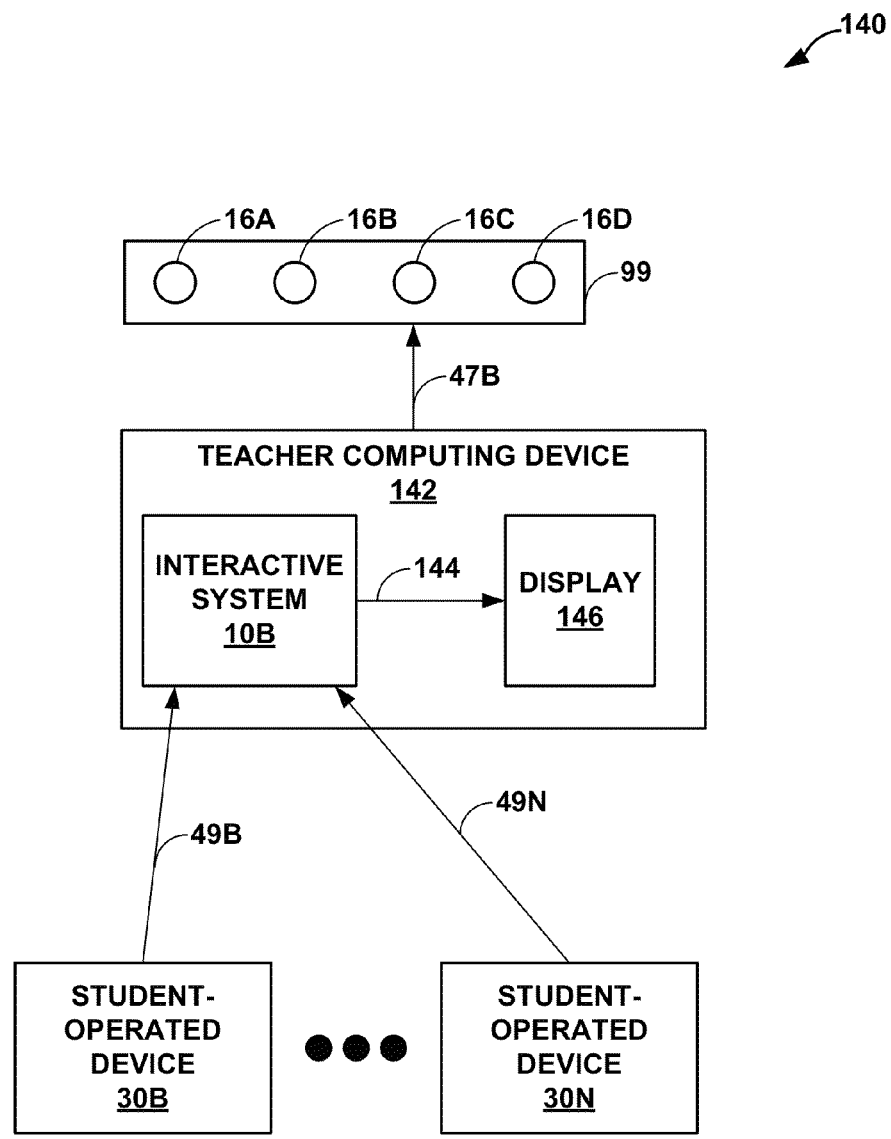
FIG. 8 is a diagram illustrating an exemplary classroom system that may perform various aspects of the techniques described in this disclosure.

FIG. 8 is a diagram illustrating an exemplary classroom system 140 that may perform various aspects of the techniques described in this disclosure. In the example of FIG. 8, a teacher computing device 142 may interface with a speaker array 99 having four speakers 16A-16D ("speakers 16") that output ultrasound beams (which are not shown in the example of FIG. 8, but which may be similar or substantially similar to the ultrasound beams 100 shown in the example of FIG. 6). The teacher computing device 142 may include one example of the interactive system 10 shown in the example of FIG. 2, and may be denoted for purposes of reference as the "interactive system 10B." The interactive system 10B may differ slightly from the interactive system 10 shown in the example of FIG. 2 in that the interactive system 10B does not necessarily include speakers 16 internal to the interactive system 10B.

Additionally, the classroom system 140 includes student-operated devices 30B-30N, each of which may represent one example of the user-operated device 30 shown in the example of FIG. 2 and may collectively be referred to, for purposes of reference, as the "student-operated devices 30." Each of student-operated devices 30 may include the microphone 14 or an array of two or more microphones 14 (not shown in the example of FIG. 8).

The techniques may be employed in the classroom system 140, where a teacher may utilize the teacher computing device 142, which may represent a laptop computer, slate computer, smart phone or other type of computing device, to identify students operating each of the student-operated devices 30. Each of the students may be associated with the microphone 14 or microphone array 14 included within a corresponding one of the student-operated devices 30. The above techniques are performed with respect to each of the microphones 14 so as to determine the location of each of the microphones 14 relative to the speaker array 14, which may be placed within the classroom and interfaced with wirelessly or physically coupled to the teacher computing device 142.

In the classroom system 140, each of the microphones 14 may be assigned a unique identifier, which in turn is associated with a student record or profile. The profile may include a picture of the student, such that the interactive system 10B included within the teacher computing device 142 may generate an image 144 that depicts the corresponding one of the determined locations 53B-53N specified within or derived from each of the respective location information 49B-49N sent by the student operated devices 30 associated with students relative to one another and the speaker array 99. This image may additionally specify student information proximate to the location 53B-53N of each of the associated students, such as the picture.

The computing device 142 may present the generated image 144 via a display 146 such that the teacher may view the student information. The display 146 may, as shown in the example of FIG. 8, be included within the teacher computing device 142 or external from the teacher computing device 142. The display 146 may comprise a liquid crystal display (LCD), a plasma display, a cathode ray tube (CRT) display, an organic light emitting diode (OLED) display, a light emitting diode (LED) display or any other type of display or visual interface. This student information, in addition to specifying a picture, may also include one or more of a name of the corresponding student, an age of the corresponding student, a gender of the corresponding student, a medical condition of the corresponding student, an allergy of the corresponding student, a ranking of the corresponding student and a grade of the corresponding student. In this context, the techniques may facilitate interactions with the students, especially at the beginning of the school year as the teacher learns the particulars of each student.

Figure 9:
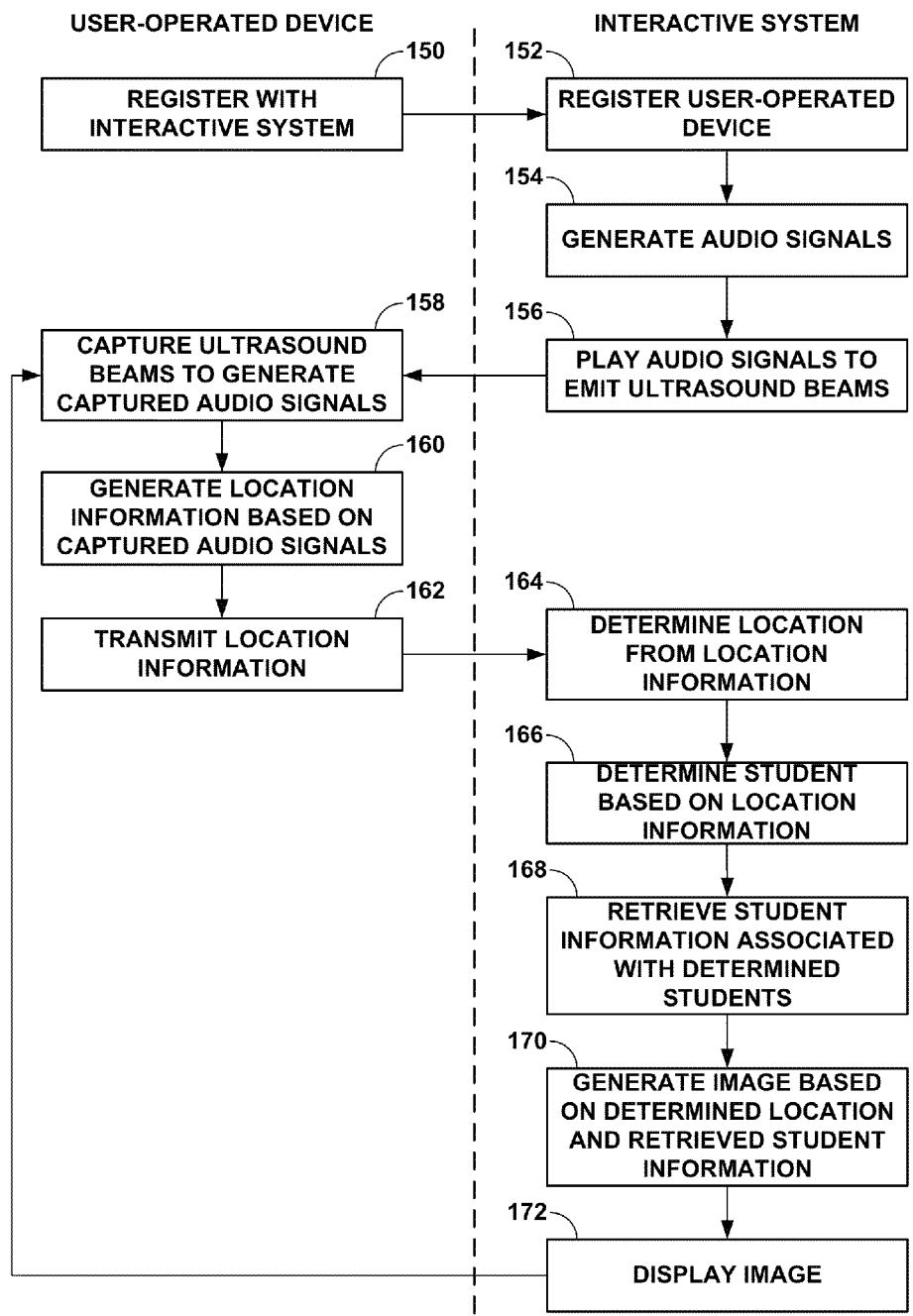
FIG. 9 is a flowchart illustrating exemplary operation of the classroom system of FIG. 8 in performing various aspects of the techniques described in this disclosure.

FIG. 9 is a flowchart illustrating exemplary operation of the classroom system 140 of FIG. 8 in performing various aspects of the techniques described in this disclosure. As described above, either the system 10B or the devices 30 shown in the example of FIG. 8 may compute, based on the captured audio signals 51 or some derivative thereof, the location 53. While described below as being computed by the system 10B, the computation aspects of the techniques may be performed devices 30 or possibly some intervening device, such as a dongle device that interfaces with the interactive system 10B or the student-operated devices 30. Moreover, while described with respect to student-operated device 30B, the techniques may be performed by any one of student-operated devices 30B-30N to perform the operations attributed to student-operated device 30B below.

In operation, the control unit 36 of the student-operated device 30B may, for example, register with the interactive system 10B (often automatically upon powering on or activating the student-operated device 30B and assuming the interactive system 10B is already powered on or activated) (150). The control unit 36 may register with the interactive system 10B by sending a registration code or other registration information, whereupon the interactive system 10B may begin generating the audio signals 47 (when not already generating audio signals 47). The interactive system 10B may register the student-operated device 30B to operate in a location-based interactive manner with the interactive system 10B (152). The control unit 32 may then invoke the ultrasound beam forming module 42 to generate the audio signals 47 in the manner described above (154). The speakers 16 may then output or play audio signals 47 to emit ultrasound beams, such as the ultrasound beams 17 shown in the example of FIG. 1 (156).

The microphone 14 of the student-operated device 30B may sense, detect or otherwise capture the sound audio signals 47 (158), generating the captured audio signals 51 (which may differ from the audio signals 47 due to noise or other interference). The control unit 36 may then invoke the microphone signal processing module 48 to process the captured audio signals 51 in the manner described above and thereby generate the location information 49B. That is, the microphone signal processing module 48 may generate the location information 49B based on the captured audio signals 51 (160). The interface 40 may transmit the location information 49B via the communication channel 50 to interface 34 of the interactive system 10B (162).

The interface 34, upon receiving this location information 49B, may transmit this location information 49B to the location determination module 44. The location determination module 44 may then determine the location 53 in any of the various ways described above (164), transmitting this location 53 to the location-based processing module 46. The location-based processing module 46 may then process this location 53 to perform any of the actions described in this disclosure. In the classroom context, the location-based processing module 46 may determine a student associated with the student-operated device 30B based on the location information 53 (166). The location-based processing module 46 may then retrieve student information associated with the determined student (168). The location-based processing module 46 may generate an image based on the determined location and the retrieved student information and display the image via the display 146, as described above (170, 172).

Figure 10:
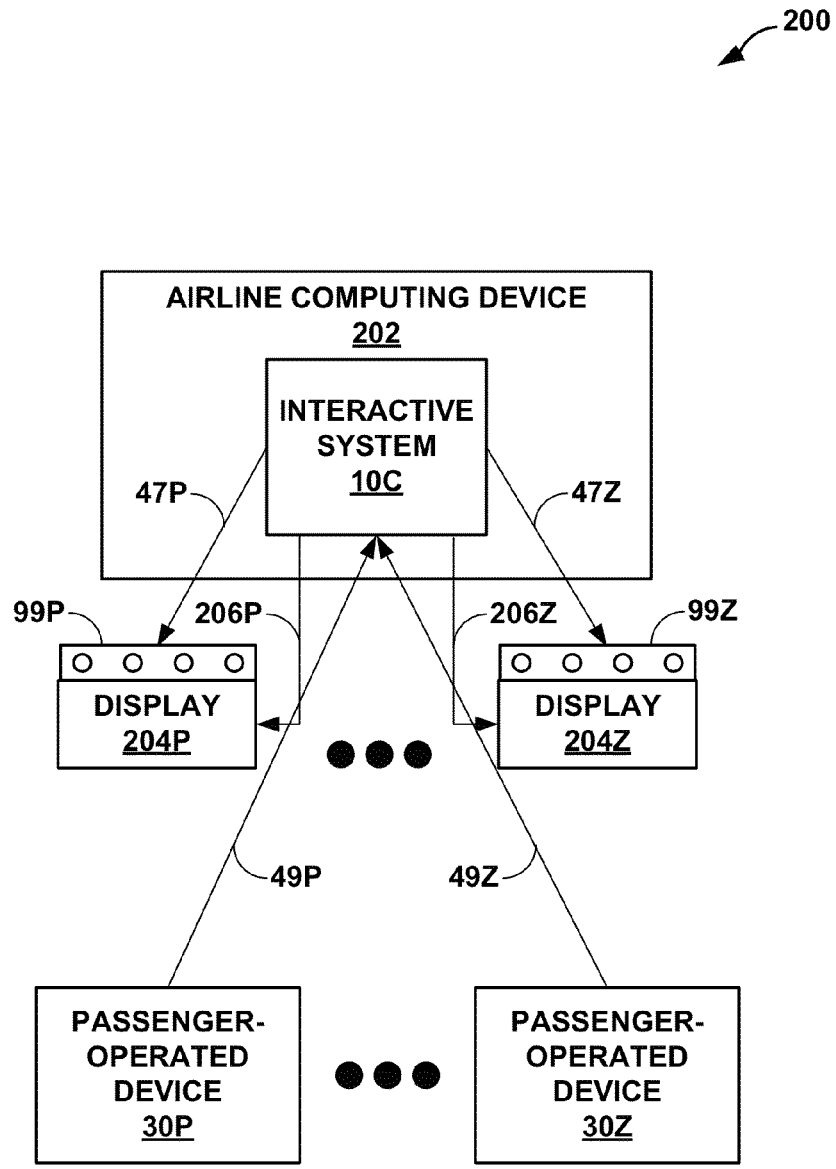
FIG. 10 is a diagram illustrating an exemplary airline system that may perform various aspects of the techniques described in this disclosure.

FIG. 10 is a diagram illustrating an exemplary airline system 200 that may perform various aspects of the techniques described in this disclosure. In the example of FIG. 10, an airline computing device 202 may interface with speaker arrays 99P-99Z ("speaker arrays 99") having speakers that output ultrasound beams (which are not shown in the example of FIG. 10, but which may be similar or substantially similar to the ultrasound beams 100 shown in the example of FIG. 6). The airline computing device 202 may include one example of the interactive system 10 shown in the example of FIG. 2, and may be denoted for purposes of reference as the "interactive system 10C." The interactive system 10C may differ slightly from the interactive system 10 shown in the example of FIG. 2 in that the interactive system 10C does not necessarily include speaker arrays 99 internal to the interactive system 10B.

Additionally, the airline system 200 includes passenger-operated devices 30P-30Z, each of which may represent one example of the user-operated device 30 shown in the example of FIG. 2 and may collectively be referred to, for purposes of reference, as the "passenger-operated devices 30." Each of student-operated devices 30 may include the microphone 14 or an array of two or more microphones 14 (not shown in the example of FIG. 10).

The techniques may be performed in the context of the airline system 200, which may represent one example of a transit registration system. In other words, the airline system 200 may be utilized for transit and other applications. To illustrate, consider airline passengers that are assigned a seat. The airline may utilize the airline system 200 to determine when all passengers have taken their seats. Moreover, the airline system 200 may interface with displays 204P-204Z ("displays 204," which may be similar or substantially similar to display 146 of the example of FIG. 8) on the backs of seats, presenting a corresponding one of images 206P-206Z ("images 206") to the passengers based on the determination that the passenger has a determined location 53 proximate to their assigned seat. The determined location 53 may be included within or otherwise derived from location information 49P-49Z (which may be similar or substantially similar to the location information 49 described above with respect to FIG. 2).

In other words, each passenger or customer of the airline may receive a microphone 14 in the form of a corresponding one of the passenger-operated devices 30 upon boarding the plane or may utilize an existing microphone 14 present in their own personal devices, e.g., a smart phone, laptop computer, slate computer, etc. The speaker arrays 99 may be placed with respect to a seat to which the different customers are able to sit. That is, the speaker arrays 99 may be located on the back of the seat in front of the seat in which the different customers are assigned.

In this example, the ultrasound mesh localization techniques may be performed with respect to each of the microphones present or included within the speaker arrays 99 so as to determine the location 53 of each of the passenger-operated devices 30 relative to the speaker arrays 99. Based on the determined location 53 of each of the passenger-operated devices 30, the on-board airline computing system 202 may determine that the different customers have sat in the seat, whereupon the on-board airline computing system 202 may present one of images 206 via a corresponding one of displays 204 (often located in seatback of the seat in front of the customer) in response to determining that the different customers have sat in the seat.

To provide a few examples, the images 206 may each specify one or more of a personalized greeting, personalized travel information tailored to accommodate profiles of the different customers, a travel upgrade available to the different customers, frequent flyer mile status specific to the different customers, registration information, connecting flight information specific to travel itineraries of the different customers, car rental information specific to the different customers, and a customs form. In this context, the techniques may facilitate greeting of the customer, providing various information relevant to the customers itinerary.

While described above with respect to being performed in an airline setting, the techniques may be performed in the context of any transit setting. That is, the interactive system 10C may be employed in subways, busses, or any other setting having passengers that board a mode of transportation. Accordingly, the techniques should not be limited in this respect.

Figure 11:
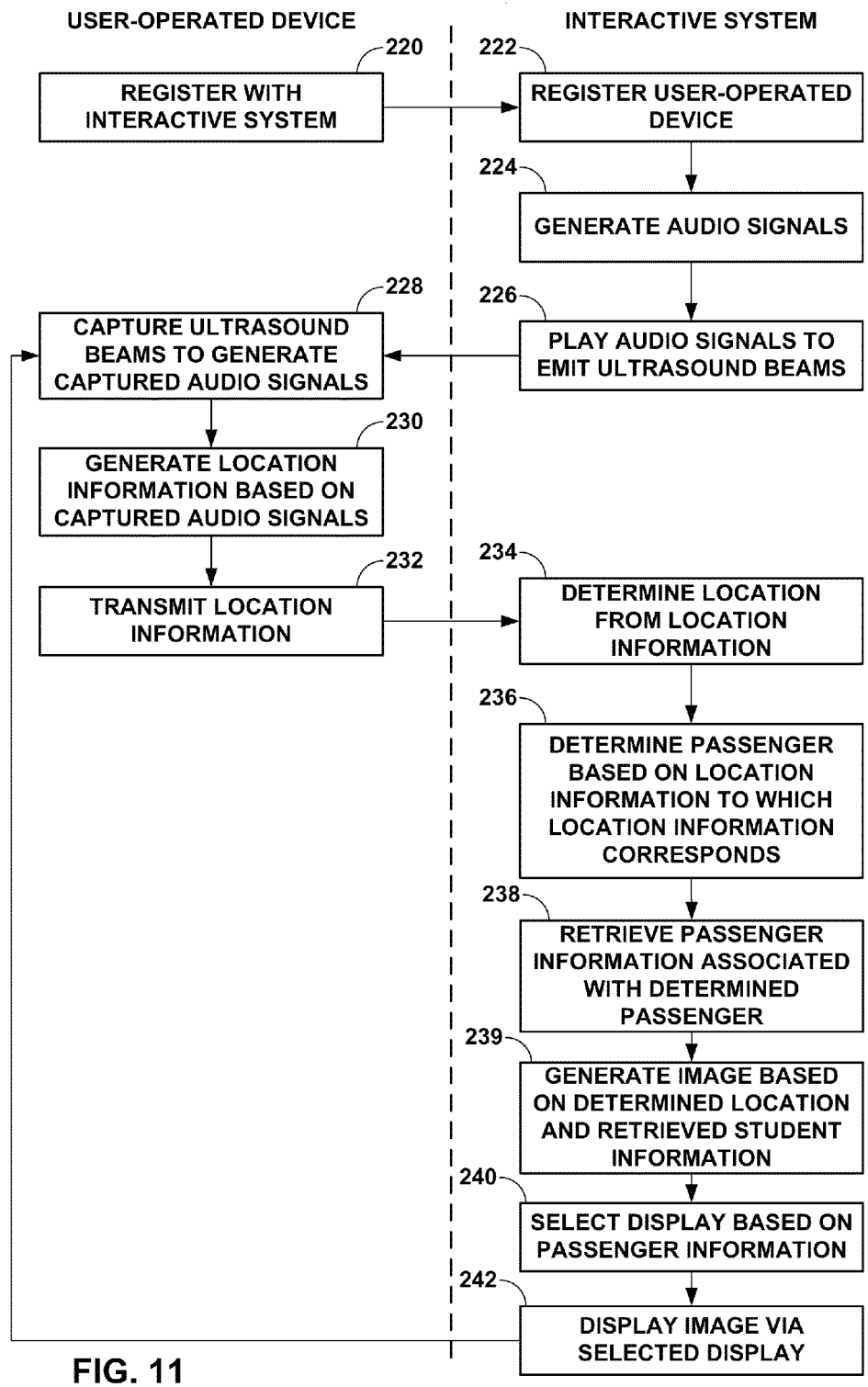
FIG. 11 is a flowchart illustrating exemplary operation of the airline system of FIG. 10 in performing various aspects of the techniques described in this disclosure.

FIG. 11 is a flowchart illustrating exemplary operation of the airline system 200 of FIG. 10 in performing various aspects of the techniques described in this disclosure. As described above, either the system 10C or the devices 30 shown in the example of FIG. 11 may compute, based on the captured audio signals 51 or some derivative thereof, the location 53. While described below as being computed by the system 10C, the computation aspects of the techniques may be performed devices 30 or possibly some intervening device, such as a dongle device that interfaces with the interactive system 10C or the passenger-operated devices 30. Moreover, while described with respect to student-operated device 30P, the techniques may be performed by any one of passenger-operated devices 30P-30Z to perform the operations attributed to student-operated device 30B below.

In operation, the control unit 36 of the passenger-operated device 30P may, for example, register with the interactive system 10C (often automatically upon powering on or activating the passenger-operated device 30P and assuming the interactive system 10C is already powered on or activated) (220). The control unit 36 may register with the interactive system 10C by sending a registration code or other registration information, whereupon the interactive system 10C may begin generating the audio signals 47 (when not already generating audio signals 47). The interactive system 10C may register the passenger-operated device 30P to operate in a location-based interactive manner with the interactive system 10C (222). The control unit 32 may then invoke the ultrasound beam forming module 42 to generate the audio signals 47 in the manner described above (224). The speakers 16 may then output or play audio signals 47 to emit ultrasound beams, such as the ultrasound beams 17 shown in the example of FIG. 1 (226).

The microphone 14 of the passenger-operated device 30P may sense, detect or otherwise capture the sound audio signals 47 (228), generating the captured audio signals 51 (which may differ from the audio signals 47 due to noise or other interference). The control unit 36 may then invoke the microphone signal processing module 48 to process the captured audio signals 51 in the manner described above and thereby generate the location information 49P. That is, the microphone signal processing module 48 may generate the location information 49P based on the captured audio signals 51 (230). The interface 40 may transmit the location information 49P via the communication channel 50 to interface 34 of the interactive system 10C (232).

The interface 34, upon receiving this location information 49P, may transmit this location information 49P to the location determination module 44. The location determination module 44 may then determine the location 53 in any of the various ways described above (234), transmitting this location 53 to the location-based processing module 46. The location-based processing module 46 may then process this location 53 to perform any of the actions described in this disclosure. In this transit context, the location-based processing module 46 may determine a passenger associated with the passenger-operated device 30P based on the location information 53 (236). The location-based processing module 46 may then retrieve passenger information associated with the determined passenger (238). The location-based processing module 46 may generate an image based on the determined location and the retrieved passenger information (239). The location-based processing module 46 may then select one of the displays 204 associated with the passenger based on the passenger information (which may specify a seat to which the passenger is to sit) (240). The location-based processing module 46 may then display the image via the selected one of the displays 204, i.e., display 204P in this example (242).

While various contexts or systems are described above, the techniques may be performed in a wide variety of contexts or systems. For example, the techniques may be performed in a gaming context, with a microphone enabled controller in hand or worn. The user may then move around the room, and the gaming console may include the interactive system to locate each of the users (assuming the controller provides another communication channel to report its location to the main system).

As another example, the techniques may be performed in the context of a media playback. That is, when using our handsets and tablet speakers as satellite speakers for a surround sound system, the current interactive system may be used to locate each satellite device and dispatch signals based on the located devices.

As another example, the techniques may be performed in the conferencing context. To illustrate, in a conference room, each attendee may wear a badge with microphone (which may comprise the user-operated device). The interactive system may then be able to detect a location of each one relative to the table. The interactive system may then interface with a microphone array on the table to form different beams toward each user and specifically pickup their words and tag the contents with their identification or other information.

As yet another example, the techniques may be performed in the performing arts context. To illustrate, the "spot person" may be replaced with the interactive system, which interfaces with the spotlight to automatically follow a microphone worn by the performer once the location of the performer is identified using the interactive system.

As still yet another example, the techniques may be performed in the context of road safety. The interactive system may be installed in a car scanning a driver wearing a small device with microphone. Whenever the head of the driver turns to the side there is a potential for an impact in the front. The head motion can be reported to the interactive system, and the interactive system may issue a warning sound to alert the driver of the potential for impact.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
   determining an amplitude of a first ultrasound signal emitted by one or more transducers included within or adjacent to a three-dimensional display device and received by a microphone included within or adjacent to three-dimensional viewing glasses, wherein the first ultrasound signal is of a first frequency;
determining an amplitude of a second ultrasound signal emitted by the one or more transducers and received by the microphone, wherein the second ultrasound signal is of a second frequency different from the first frequency;
determining a location of the microphone relative to the one or more transducers based at least on the determined amplitude of the first ultrasound signal and the determined amplitude of the second ultrasound signal;
selecting one of a plurality of views included within video data that approximates viewing a scene presented by the video data from the determined location of the microphone; and
presenting the selected one of the plurality of views.

2. The method of claim 1, wherein determining a location of the microphone relative to the one or more transducers comprises:
determining a ratio of the amplitude of the first ultrasound signal to the amplitude of the second ultrasound signal; and
determining the location of the microphone relative to the one or more transducers based at least on the determined ratio.

3. The method of claim 1, further comprising determining an amplitude of a third ultrasound signal emitted by the one or more transducers and received by the microphone,
wherein determining the location of the microphone relative to the one or more transducers comprises:
based on the amplitude of the first ultrasound signal and the amplitude of the second ultrasound signal, determining a first vector from the one or more transducers to the microphone;
based on the amplitude of the first ultrasound signal and the amplitude of the third ultrasound signal, determining a second vector from the one or more transducers to the microphone;
based on the amplitude of the second ultrasound signal and the amplitude of the third ultrasound signal, determining a third vector from the one or more transducers of the microphone; and
determining the location of the microphone relative to the one or more transducers based on two or more of the determined first vector, the determined second vector and the determined third vector.

4. The method of claim 3, wherein determining the location of the microphone relative to the one or more transducers comprises:
identifying one of the determined first vector, the determined second vector and the determined third vector that identifies a location of the microphone outside of a threshold location derived based on the remaining two of the determined first vector, the determined second vector and the determined third vector;
discarding the identified one of the determined first vector, the determined second vector and the determined third vector that identifies a location of the microphone outside of the threshold location; and
determining the location of the microphone relative to the one or more transducers based on the remaining two of the determined first vector, the determined second vector and the determined third vector.

5. The method of claim 1,
wherein the one or more transducers are included in a first device,
wherein the microphone is included in a second device,
wherein determining the amplitude of the first ultrasound signal comprises receiving, with the first device, the amplitude of the first ultrasound signal from the second device,
wherein determining the amplitude of the second ultrasound signal comprises receiving, with the first device, the amplitude of the second ultrasound signal from the second device, and
wherein determining the location of the microphone comprises determining, with the first device, the location of the microphone relative to the one or more transducers based at least on the determined amplitude of the first ultrasound signal and the determined amplitude of the second ultrasound signal.

6. The method of claim 1, wherein the one or more transducers are included in a first device,
wherein the microphone is included in a second device,
wherein determining the amplitude of the first ultrasound signal comprises determining, with the second device, the amplitude of the first ultrasound signal,
wherein determining the amplitude of the second ultrasound signal comprises determining, with the second device, the amplitude of the second ultrasound signal, and
wherein determining the location of the microphone comprises determining, with the second device, the location of the microphone relative to the one or more transducers based at least on the determined amplitude of the first ultrasound signal and the determined amplitude of the second ultrasound signal.

7. The method of claim 1, wherein the transducers are arranged as an array of transducers.

8. The method of claim 7,
wherein the array of transducers are arranged such that each of the transducers in the array face the same direction,
wherein the method further comprises:
processing the first ultrasound signal prior to providing the first ultrasound signal to the transducers in the array so as to generate a first directional ultrasound signal that, when emitted by the transducers in the array, appears to be directed in a first direction;
processing the second ultrasound signal prior to providing the second ultrasound signal to the transducers in the array so as to generate a second directional ultrasound signal that, when emitted by the transducers in the array, appears to be directed in a second direction; and
concurrently providing the first and second directional ultrasound signals to the transducers in the array such that the transducers in the array concurrently emit the first and second direction ultrasound signals as the first and second ultrasound signals.

9. An interactive system comprising:
one or more processors configured to determine an amplitude of a first ultrasound signal emitted by one or more transducers included within or adjacent to a three-dimensional display device and received by a microphone included within or adjacent to three-dimensional viewing glasses, wherein the first ultrasound signal is of a first frequency, determine an amplitude of a second ultrasound signal emitted by the one or more transducers and received by the microphone, wherein the second ultrasound signal is of a second frequency different from the first frequency, determine a location of the microphone relative to the one or more transducers based at least on the determined amplitude of the first ultrasound signal and the determined amplitude of the second ultrasound signal, select one of a plurality of views included within video data that approximates viewing a scene presented by the video data from the determined location of the microphone; and a memory configured to store the determined location.

10. The interactive system of claim 9, wherein the one or more processors are further configured to, when determining a location of the microphone relative to the one or more transducers, determine a ratio of the amplitude of the first ultrasound signal to the amplitude of the second ultrasound signal, and determine the location of the microphone relative to the one or more transducers based at least on the determined ratio.

11. The interactive system of claim 9,
wherein the one or more processors are further configured to determine an amplitude of a third ultrasound signal emitted by the one or more transducers and received by the microphone,
wherein the one or more processors are further configured to, when determining the location of the microphone relative to the one or more transducers, based on the amplitude of the first ultrasound signal and the amplitude of the second ultrasound signal, determine a first vector from the one or more transducers to the microphone, based on the amplitude of the first ultrasound signal and the amplitude of the third ultrasound signal, determine a second vector from the one or more transducers to the microphone, based on the amplitude of the second ultrasound signal and the amplitude of the third ultrasound signal, determine a third vector from the one or more transducers of the microphone, and determine the location of the microphone relative to the one or more transducers based on two or more of the determined first vector, the determined second vector and the determined third vector.

12. The interactive system of claim 11, wherein the one or more processors are further configured to, when determining the location of the microphone relative to the one or more transducers, identify one of the determined first vector, the determined second vector and the determined third vector that identifies a location of the microphone outside of a threshold location derived based on the remaining two of the determined first vector, the determined second vector and the determined third vector, discard the identified one of the determined first vector, the determined second vector and the determined third vector that identifies a location of the microphone outside of the threshold location, and determine the location of the microphone relative to the one or more transducers based on the remaining two of the determined first vector, the determined second vector and the determined third vector.

13. The interactive system of claim 9,
wherein the one or more transducers are included in a first device of the interactive system,
wherein the microphone is included in a second device that interfaces with the interactive system,
wherein the one or more processors are further configured to, when determining the amplitude of the first ultrasound signal, receive the amplitude of the first ultrasound signal from the second device,
wherein the one or more processors are further configured to, when determining the amplitude of the second ultrasound signal, receive the amplitude of the second ultrasound signal from the second device, and
wherein the one or more processors are further configured to, when determining the location of the microphone, determine the location of the microphone relative to the one or more transducers based at least on the determined amplitude of the first ultrasound signal and the determined amplitude of the second ultrasound signal.

14. The interactive system of claim 9,
wherein the one or more transducers are included in a first device of the interactive system,
wherein the microphone is included in a second device that interfaces with the interactive system,
wherein the second device determines the amplitude of the first ultrasound signal, determines the amplitude of the second ultrasound signal, and determines the location of the microphone relative to the one or more transducers based at least on the determined amplitude of the first ultrasound signal and the determined amplitude of the second ultrasound signal,
wherein the one or more processors are further configured to, when determining the location of the microphone, receive the location of the microphone relative to the one or more transducers from the second device.

15. The interactive system of claim 9, wherein the transducers are arranged as an array of transducers.

16. The interactive system of claim 15,
wherein the array of transducers are arranged such that each of the transducers in the array face the same direction,
wherein the one or more processors are further configured to process the first ultrasound signal prior to providing the first ultrasound signal to the transducers in the array so as to generate a first directional ultrasound signal that, when emitted by the transducers in the array, appears to be directed in a first direction, process the second ultrasound signal prior to providing the second ultrasound signal to the transducers in the array so as to generate a second directional ultrasound signal that, when emitted by the transducers in the array, appears to be directed in a second direction, and concurrently provide the first and second directional ultrasound signals to the transducers in the array such that the transducers in the array concurrently emit the first and second direction ultrasound signals as the first and second ultrasound signals.

17. An interactive system comprising:
means for determining an amplitude of a first ultrasound signal emitted by one or more transducers included within or adjacent to a three-dimensional display device and received by a microphone included within or adjacent to three-dimensional viewing glasses, wherein the first ultrasound signal is of a first frequency;
means for determining an amplitude of a second ultrasound signal emitted by the one or more transducers and received by the microphone, wherein the second ultrasound signal is of a second frequency different from the first frequency;
means for determining a location of the microphone relative to the one or more transducers based at least on the determined amplitude of the first ultrasound signal and the determined amplitude of the second ultrasound signal;
means for selecting one of a plurality of views included within video data that approximates viewing a scene presented by the video data from the determined location of the microphone; and
means for presenting the selected one of the plurality of views.

18. The interactive system of claim 17, wherein the means for determining a location of the microphone relative to the one or more transducers comprises:

means for determining a ratio of the amplitude of the first ultrasound signal to the amplitude of the second ultrasound signal; and means for determining the location of the microphone relative to the one or more transducers based at least on the determined ratio.

19. The interactive system of claim 17, further comprising means for determining an amplitude of a third ultrasound signal emitted by the one or more transducers and received by the microphone,
wherein the means for determining the location of the microphone relative to the one or more transducers comprises:
means for, based on the amplitude of the first ultrasound signal and the amplitude of the second ultrasound signal, determining a first vector from the one or more transducers to the microphone;
means for, based on the amplitude of the first ultrasound signal and the amplitude of the third ultrasound signal, determining a second vector from the one or more transducers to the microphone;
means for, based on the amplitude of the second ultrasound signal and the amplitude of the third ultrasound signal, determining a third vector from the one or more transducers of the microphone; and
means for determining the location of the microphone relative to the one or more transducers based on two or more of the determined first vector, the determined second vector and the determined third vector.

20. The interactive system of claim 19, wherein the means for determining the location of the microphone relative to the one or more transducers comprises:
means for identifying one of the determined first vector, the determined second vector and the determined third vector that identifies a location of the microphone outside of a threshold location derived based on the remaining two of the determined first vector, the determined second vector and the determined third vector;
means for discarding the identified one of the determined first vector, the determined second vector and the determined third vector that identifies a location of the microphone outside of the threshold location; and
means for determining the location of the microphone relative to the one or more transducers based on the remaining two of the determined first vector, the determined second vector and the determined third vector.

21. The interactive system of claim 17,
wherein the interactive system is included in a first device,
wherein the microphone is included in a second device that interfaces with the interactive system,
wherein the means for determining the amplitude of the first ultrasound signal comprises means for receiving the amplitude of the first ultrasound signal from the second device,
wherein the means for determining the amplitude of the second ultrasound signal comprises means for receiving the amplitude of the second ultrasound signal from the second device, and
wherein the means for determining the location of the microphone comprises means for determining the location of the microphone relative to the one or more transducers based at least on the determined amplitude of the first ultrasound signal and the determined amplitude of the second ultrasound signal.

22. The interactive system of claim 17,
wherein the interactive system is included in a first device,
wherein the microphone is included in a second device,
wherein the second device determines the amplitude of the first ultrasound signal, determines the amplitude of the second ultrasound signal, and determines the location of the microphone relative to the one or more transducers based at least on the determined amplitude of the first ultrasound signal and the determined amplitude of the second ultrasound signal,
wherein the means for determining the location of the microphone comprises means for receive the location of the microphone relative to the one or more transducers from the second device.

23. The interactive system of claim 17, wherein the transducers are arranged as an array of transducers.

24. The interactive system of claim 23,
wherein the array of transducers are arranged such that each of the transducers in the array face the same direction,
wherein the interactive system further comprises:
means for processing the first ultrasound signal prior to providing the first ultrasound signal to the transducers in the array so as to generate a first directional ultrasound signal that, when emitted by the transducers in the array, appears to be directed in a first direction;
means for processing the second ultrasound signal prior to providing the second ultrasound signal to the transducers in the array so as to generate a second directional ultrasound signal that, when emitted by the transducers in the array, appears to be directed in a second direction; and
means for concurrently providing the first and second directional ultrasound signals to the transducers in the array such that the transducers in the array concurrently emit the first and second direction ultrasound signals as the first and second ultrasound signals.

25. A non-transitory computer-readable storage medium having stored thereon instructions that, when executed, cause one or more processors of an interactive system to:
determine an amplitude of a first ultrasound signal emitted by one or more transducers included within or adjacent to a three-dimensional display device and received by a microphone included within or adjacent to three-dimensional viewing glasses, wherein the first ultrasound signal is of a first frequency;
determine an amplitude of a second ultrasound signal emitted by the one or more transducers and received by the microphone, wherein the second ultrasound signal is of a second frequency different from the first frequency;
determine a location of the microphone relative to the one or more transducers based at least on the determined amplitude of the first ultrasound signal and the determined amplitude of the second ultrasound signal;
select one of a plurality of views included within video data that approximates viewing a scene presented by the video data from the determined location of the microphone; and
present the selected one of the plurality of views.

26. The non-transitory computer-readable storage medium of claim 25, wherein the instructions further cause, when executed, the one or more processors to, when determining a location of the microphone relative to the one or more transducers, determine a ratio of the amplitude of the first ultrasound signal to the amplitude of the second ultrasound signal, and determine the location of the microphone relative to the one or more transducers based at least on the determined ratio.

27. The non-transitory computer-readable storage medium of claim 25, further comprising instructions that, when executed cause the one or more processors to determine an amplitude of a third ultrasound signal emitted by the one or more transducers and received by the microphone, wherein the instructions further cause, when executed, the one or more processors to, when determining the location of the microphone relative to the one or more transducers, based on the amplitude of the first ultrasound signal and the amplitude of the second ultrasound signal, determine a first vector from the one or more transducers to the microphone, based on the amplitude of the first ultrasound signal and the amplitude of the third ultrasound signal, determine a second vector from the one or more transducers to the microphone, based on the amplitude of the second ultrasound signal and the amplitude of the third ultrasound signal, determine a third vector from the one or more transducers of the microphone, and determine the location of the microphone relative to the one or more transducers based on two or more of the determined first vector, the determined second vector and the determined third vector.

28. The non-transitory computer-readable storage medium of claim 27, wherein the instructions further cause, when executed, the one or more processors to, when determining the location of the microphone relative to the one or more transducers, identify one of the determined first vector, the determined second vector and the determined third vector that identifies a location of the microphone outside of a threshold location derived based on the remaining two of the determined first vector, the determined second vector and the determined third vector, discard the identified one of the determined first vector, the determined second vector and the determined third vector that identifies a location of the microphone outside of the threshold location, and determine the location of the microphone relative to the one or more transducers based on the remaining two of the determined first vector, the determined second vector and the determined third vector.

29. The non-transitory computer-readable storage medium of claim 25, wherein the transducers are arranged as an array of transducers such that each of the transducers in the array face the same direction, wherein the non-transitory computer readable storage medium has further stored thereon instructions that, when executed, cause one or more processors to:

process the first ultrasound signal prior to providing the first ultrasound signal to the transducers in the array so as to generate a first directional ultrasound signal that, when emitted by the transducers in the array, appears to be directed in a first direction;

process the second ultrasound signal prior to providing the second ultrasound signal to the transducers in the array so as to generate a second directional ultrasound signal that, when emitted by the transducers in the array, appears to be directed in a second direction; and concurrently provide the first and second directional ultrasound signals to the transducers in the array such that the transducers in the array concurrently emit the first and second direction ultrasound signals as the first and second ultrasound signals.

* * * * *